United States Patent [19]

Morisawa et al.

[11] Patent Number: 5,931,948
[45] Date of Patent: *Aug. 3, 1999

[54] PORTABLE COMPUTER SYSTEM HAVING PASSWORD CONTROL MEANS FOR HOLDING ONE OR MORE PASSWORDS SUCH THAT THE PASSWORDS ARE UNREADABLE BY DIRECT ACCESS FROM A MAIN PROCESSOR

[75] Inventors: Toshikazu Morisawa, Tokorozawa; Masayo Yamaki, Tokyo; Hiroyuki Tsukada, Tokyo; Tohru Mamata, Tokyo; Tatsuya Kawawa, Tokyo, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/927,295

[22] Filed: Sep. 11, 1997

Related U.S. Application Data

[63] Continuation of application No. 08/642,389, May 3, 1996, abandoned, which is a continuation of application No. 08/106,922, Aug. 16, 1993, Pat. No. 5,537,544.

[30] Foreign Application Priority Data

Sep. 17, 1992 [JP] Japan .................................. P4-248355
Sep. 17, 1992 [JP] Japan .................................. P4-248357
Sep. 17, 1992 [JP] Japan .................................. P4-248358
Sep. 17, 1992 [JP] Japan .................................. P4-248371
Sep. 17, 1992 [JP] Japan .................................. P4-248373

[51] Int. Cl.$^6$ .............................. G06F 12/14; H04L 9/00
[52] U.S. Cl. ........................................... 713/202; 713/201
[58] Field of Search .......................... 395/188.01; 380/3, 380/4, 25; 364/225, 260.81, 864, 865, 866; 713/200, 201, 202

[56] References Cited

U.S. PATENT DOCUMENTS

| | | | |
|---|---|---|---|
| 4,672,572 | 6/1987 | Alsberg | 364/900 |
| 4,942,606 | 7/1990 | Kaiser et al. | 380/4 |
| 4,959,860 | 9/1990 | Watters et al. | 380/4 |
| 5,018,096 | 5/1991 | Aoyama | 364/900 |
| 5,115,508 | 5/1992 | Hatta | 395/725 |
| 5,120,939 | 6/1992 | Claus et al. | 235/382 |
| 5,175,853 | 12/1992 | Kardach et al. | 395/650 |
| 5,212,729 | 5/1993 | Schafer | 380/4 |
| 5,226,080 | 7/1993 | Cole et al. | 380/25 |
| 5,272,754 | 12/1993 | Boerbert | 380/25 |
| 5,276,888 | 1/1994 | Kardach et al. | 395/725 |
| 5,282,247 | 1/1994 | McLean et al. | 380/4 |

FOREIGN PATENT DOCUMENTS

| | | | |
|---|---|---|---|
| 0 382 470 A3 | 2/1990 | European Pat. Off. | G06F 1/00 |
| 0 394 834 A2 | 10/1990 | European Pat. Off. | G06F 1/00 |
| 2-162443 | 6/1990 | Japan . | |
| 4-42326 | 2/1992 | Japan . | |
| 5-19886 | 1/1993 | Japan . | |

OTHER PUBLICATIONS

White, Fisch & Pooch, Computer System and Network Security, CKC Press 1996, at Chapters 4 and 6.

Primary Examiner—Ly V. Hua
Attorney, Agent, or Firm—Limbach & Limbach L.L.P.

[57] ABSTRACT

A portable computer system includes a keyboard for inputting at least a password, and a main CPU for controlling the system operation to perform a data processing. Particularly, the computer system further includes a password control section, holding one or more registered passwords as being unreadable by direct access from the main CPU, for allowing the main CPU to perform the data processing when a password identical to one of the registered passwords held therein is input by the keyboard.

5 Claims, 16 Drawing Sheets

(SERVICE EXAMPLE)

| PASSWORD #1; SUPERVISOR | ACCESS RIGHT #1 ; HAS FULL |
| PASSWORD #2; MANEGER | ACCESS RIGHT #2 ; PASSWORD MODIFIABLE |
| PASSWORD #3; MEMBER A | ACCESS RIGHT #3 ; PASSWORD UNMODIFIABLE |
| PASSWORD #4; MEMBER B | ACCESS RIGHT #4 ; PASSWORD (DEVICE X USABLE) |
| ⋮ ⋮ | ⋮ ⋮ |
| PASSWORD #n; MEMBER N | ACCESS RIGHT #n ; PASSWORD (DEVICE Z USABLE) |

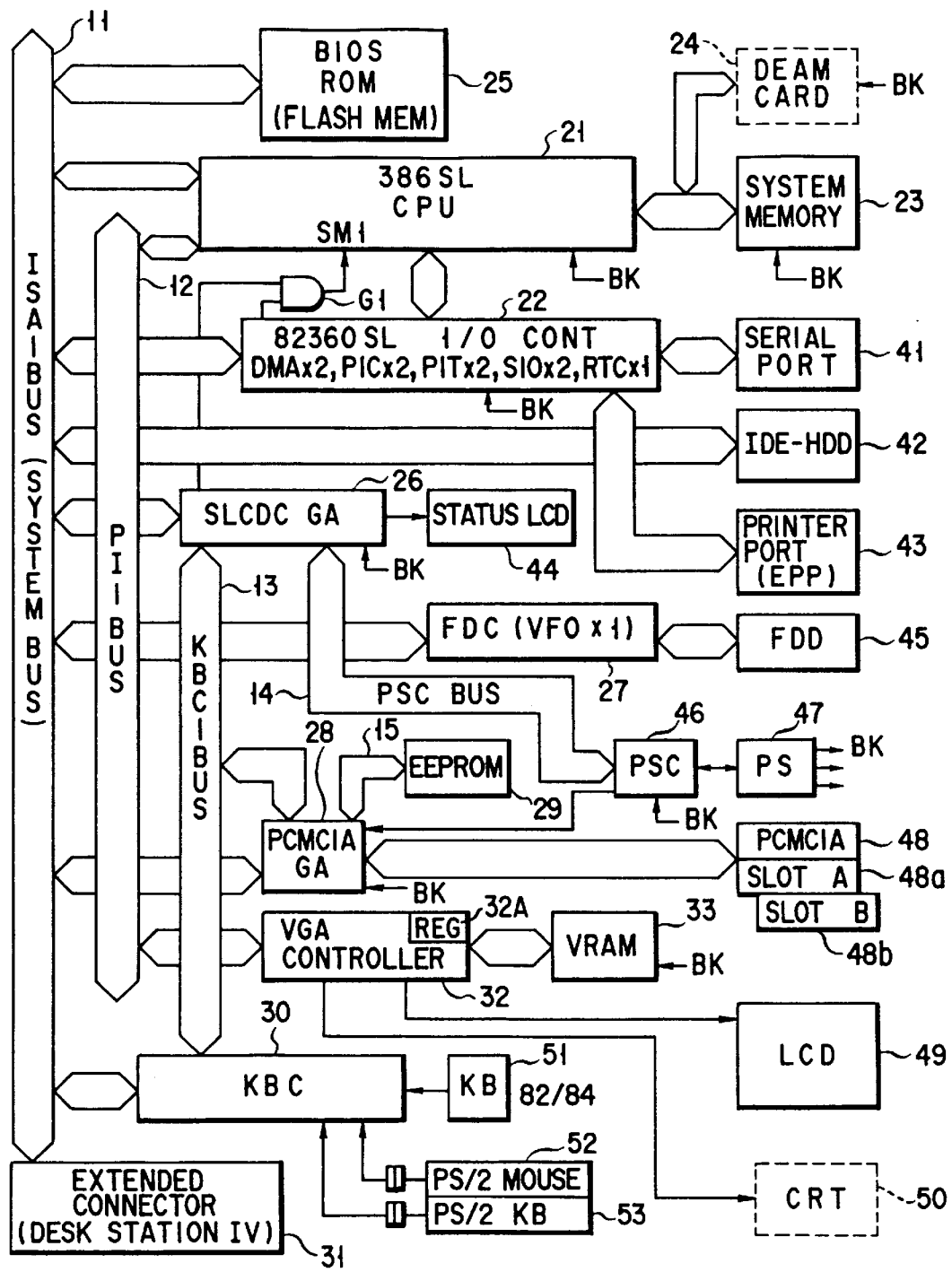
F I G. 2

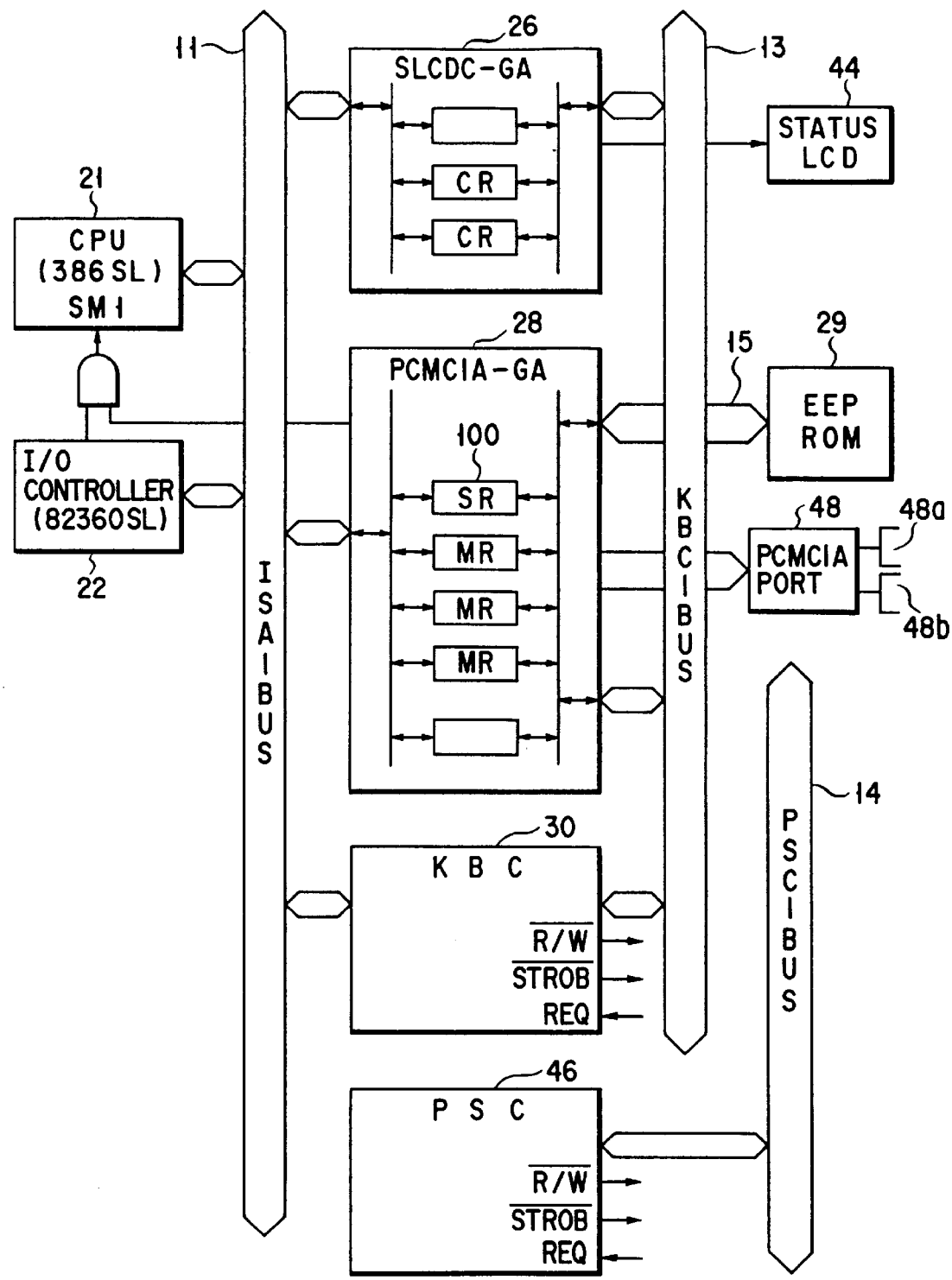
F I G. 3

| ORDINARY USER (NO PASSWORD) | | | | |
|---|---|---|---|---|
| ORDINARY USER (WITH PASSWORD) | | | | |
| FOR MAINTENANCE (B) | | | | |
| FOR MAINTENANCE (A) | | | | |
| MAINTENANCE PRIVILEGE | 1 | 1 | 0 | 1 |
| SUPERVISOR PRIVILEGE | 1 | 1 | SETTABLE | 1 |
| PASSWORD UPDATING RIGHT | 1 | 1 | SETTABLE | 1 |
| HDD ACCESS RIGHT | 1 | 1 | SETTABLE | 1 |
| FDD ACCESS RIGHT | 1 | 1 | SETTABLE | 1 |
| SERIAL PORT ACCESS RIGHT | 1 | 1 | SETTABLE | 1 |
| PRINTER PORT ACCESS RIGHT | 1 | 1 | SETTABLE | 1 |
| PCMCIA ACCESS RIGHT | 1 | 1 | SETTABLE | 1 |

1: WITH RIGHT
0: WITHOUT RIGHT

<SYSTEM ACCESS RIGHT>

MAINTENANCE PRIVILEGE ···· ENABLING FOR ALTERING FLASH BIOS, INITIALIZING EEPROM

SUPERVISOR PRIVILEGE ···· ENABLING FOR SETTING·ALTERING·DELETING OF POWER-ON PASSWORD AND ACCESS RIGHT

PASSWORD UPDATING RIGHT ··· ENABLING FOR ONLY UPDATING POWER-ON PASSWORD (DISABLING FOR DELETING)

<DEVICE ACCESS RIGHT>

HDD ACCESS RIGHT ··· ENABLING FOR ACCESSING TO HDD

FDD ACCESS RIGHT ··· ENABLING FOR ACCESSING TO FDD

SERIAL PORT ACCESS RIGHT ··· ENABLING FOR ACCESSING TO COMMUNICATION VIA SERIAL PORT

PRINTER PORT ACCESS RIGHT ··· USABLE FOR PRINTER

PCMCIA ACCESS RIGHT ···· USABLE FOR INTERFACE OF PCMCIA

F I G. 5

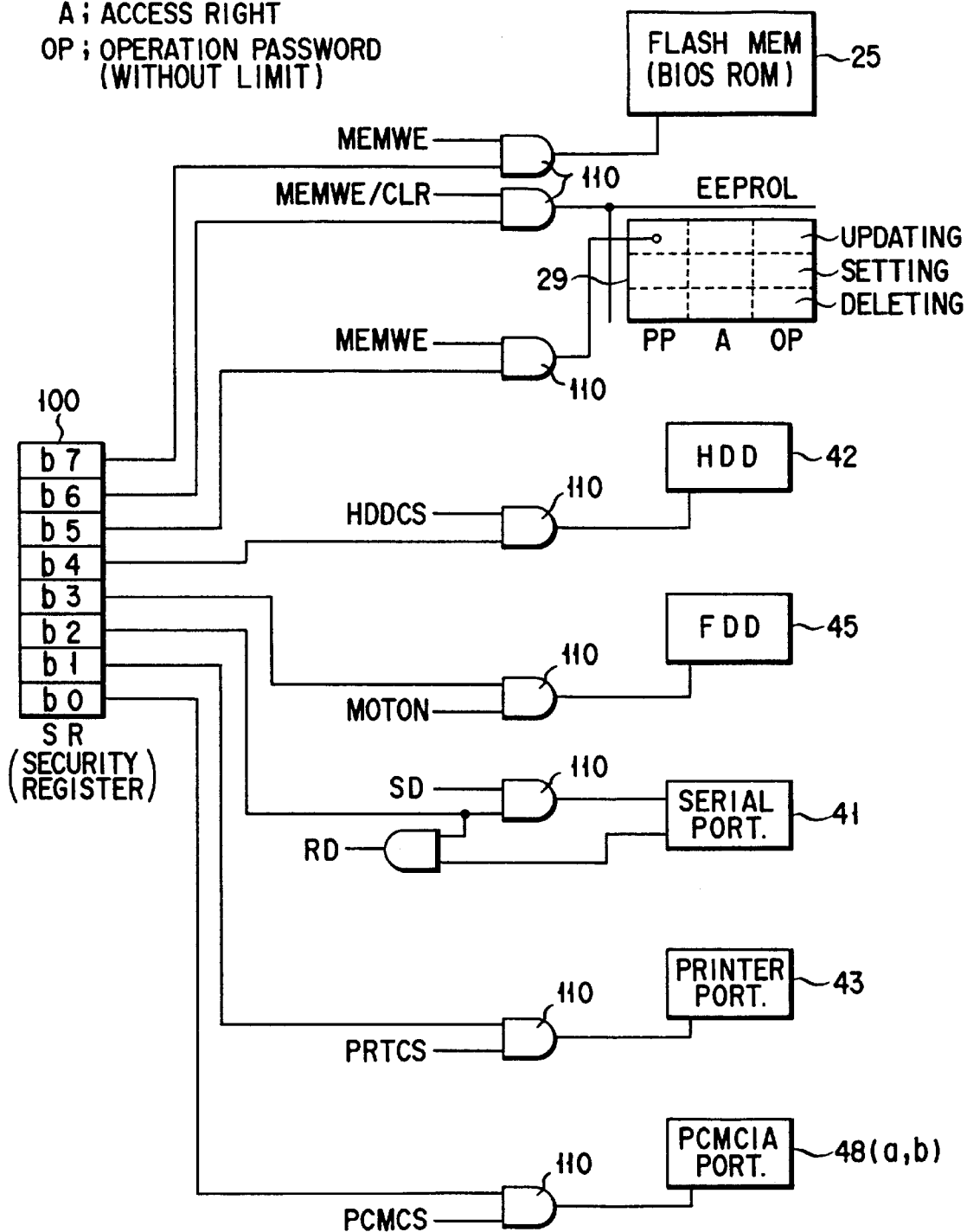
F I G. 7

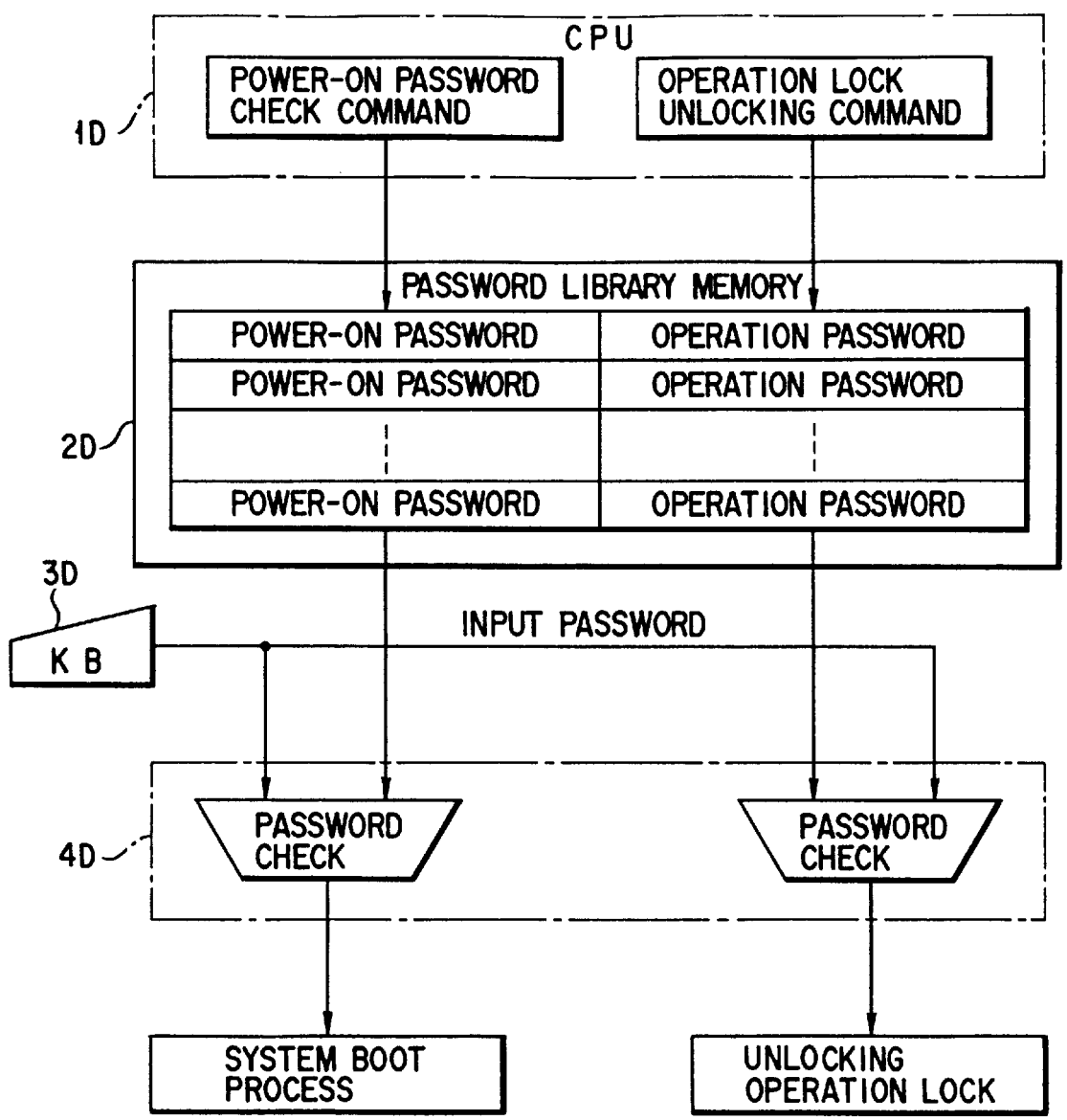
F I G. 12

PORTABLE COMPUTER SYSTEM HAVING PASSWORD CONTROL MEANS FOR HOLDING ONE OR MORE PASSWORDS SUCH THAT THE PASSWORDS ARE UNREADABLE BY DIRECT ACCESS FROM A MAIN PROCESSOR

This is a continuation of application Ser. No. Rule 1.62 Cont. of Ser. No. 08/642,389 filed on May 3, 1996, now abandoned. Which is a continuation of application Ser. No. 08/106,922, filed Aug. 16, 1993, now U.S. Pat. No. 5,537,544.

BACKGROUND OF THE INVENTION

1. Field of the Invention

The present invention relates to a portable computer system having a security function for confirming that the operator is an authorized user.

2. Description of the Related Art

Recently, personal computers have been reduced in size and weight to be more easily portable, and enhanced in performance and functions. Particularly, laptop type personal computers driven by a battery and having a large capacity memory such as a Hard Disk Drive (HDD), a RAM pack, and further a card interface, for example, of Personal Computer Memory Card International Association (PCMCIA) cards are widely popular.

The most advantageous feature of these personal computers resides in that everyone can easily use them by a simple operation irrespective of a place. On the other hand, wide spread of the personal computers tends to increase the opportunity of processing secret information. Therefore, sufficient consideration is required with regard to the security function.

Conventionally, the security function is realized by programming the computer to check a password input by the operator each time the power source is switched on. In this password check, inputting of a password is requested immediately after start of power supply, and then it is checked whether the input password coincides with a password previously registered. When coincidence is detected therebetween, the personal computer becomes active to start a data processing corresponding to an instruction input by the operator.

However, the conventional security function has the following drawbacks.

(a) In a case where the personal computer incorporates a hard disk storing secret information, anyone of authorized users can obtain the information by instructing the computer to access the hard disk. This bothers a restricted number of the authorized users who take responsibility for the management of the secret information. Further, if there are many authorized users who knows the password, there is a possibility that an unauthorized user easily gets the password from one of them.

(b) The aforementioned personal computer generally includes a CPU for controlling the system operation, a password memory for storing a registered password, and a system bus connected between the CPU and the password memory. The CPU accesses the password memory via the system bus to read the registered password stored in the password memory. Therefore, there is a possibility that an unauthorized user gets the registered password from the password memory by an unacceptable access method.

(c) Some of the personal computers has a resume function in which a data processing is interrupted after the main power source is switched off, and restarted from the interrupted point after the main power source is switched on. In a case where an operator has switched off the main power source after setting a mode of the resume function to leave the computer, a display stops to display the display data stored in a video RAM. At this time, a backup power is supplied to the video RAM and the video RAM maintains the display data under the backup power. When the main power source is switched on, the display starts to display the display data stored in the video RAM. At this time, a password-input window is displayed on a part of the display screen. Therefore, anyone can obtain information concerning the interrupted data processing from the display data displayed in the background of the password-input window. In other words, an unauthorized user can obtain the information without inputting any password.

(d) Some of the personal computers has an instant security function such as an operation lock function in which display and keyboard operations are locked without interrupting the data processing. To unlock the operations, it is necessary to input a password is identical to that accepted in the password checking effected at the time of power-on. In this power-on password checking, if a wrong password has been input, for example, more than two times, inputting of the next password is generally rejected for at least a preset period of time thereafter. If the password is simplified to facilitate the unlocking, the reliability of the security function will be lowered. In addition, the number of times a wrong password is input is not counted in the operation lock password checking, since this checking is effected after the operator is detected to be an authorized user in the power-on password checking. Therefore, it is possible for an unauthorized user to find the registered password by repeatedly inputting a password selected at random.

(e) Assume that an operator left the computer after setting a mode of the resume function and switching off the main power source. The interrupted data processing will be restarted when a password indicating an authorized user is input after the main power source is switched on. However, if the password is input by another unfamiliar operator, this operator may cause the restarted data processing to be in a state that the operator who left the computer cannot continue his or her job.

SUMMARY OF THE INVENTION

An object of the present invention is to provide a portable computer system which can improve the reliability of its security function.

According to a first aspect of the present invention, there is provided a portable computer system which comprises: an input section for inputting at least a password; a main processor section for controlling the operation of the system to perform a data processing; and a password control section, holding one or more registered passwords as being unreadable by direct access from the main processor section, for allowing the main processor section to perform the data processing when a password identical to one of the registered passwords held therein is input by the input section.

According to a second aspect of the present invention, there is provided a portable computer system which comprises: an input section for inputting at least a password; a main processor section for controlling the operation of the system to perform a data processing; and a password control section, holding one or more registered passwords as being unreadable by direct access from the main processor section, for allowing the main processor section to perform the data processing when a password identical to one of the registered passwords held therein is input by the input section, wherein the password control section includes a restricting section for restricting a functional range of the data processing based on the type of the registered password which coincides with the input password.

According to a third aspect of the present invention, there is provided a portable computer system which comprises an input section for inputting at least a password; a main processor section for controlling the operation of the system to perform a data processing; and a password control section, holding one or more registered passwords as being unreadable by direct access from the main processor section, for allowing the main processor section to perform the data processing when a password identical to one of the registered passwords held therein is input by the input section, wherein the password control section includes a non-volatile password memory for storing one or more registered passwords, and a password checking section for checking whether the input password coincides with any one of the registered passwords stored in the password memory, the main processor section is connected to the password checking section via a system bus, and the password checking section is connected to the password memory via a memory bus independent of the system bus to hide the password memory from the main processor section.

According to a fourth aspect of the present invention, there is provided a portable computer system which comprises an input section for inputting at least a password; a main processor section for controlling the operation of the system to perform a data processing; a password control section, holding one or more registered passwords as being unreadable by direct access from the main processor section, for allowing the main processor section to perform the data processing when a password identical to one of the registered passwords held therein is input by the input section; a secondary power-supported display memory, for storing display data produced by the main processor section; a display for displaying the display data stored in the display memory; and a secondary power-supported system memory, for storing processing state data obtained when the data processing is interrupted, wherein the password control section includes a nonvolatile password memory for storing one or more registered passwords, and a password checking section for checking whether the input password coincides with any one of the registered passwords stored in the password memory, and the main processor section includes a setup section for setting up a system configuration with respect to available functional modes and hardware resources, a suspension section for interrupting the data processing and saving the processing state data in the system memory when a main power source is switched off in a resume mode, a resume section for restoring the saved processing state data when the main power source is switched on in the resume mode, and a display inhibiting section for inhibiting the display data stored in the display memory from being displayed before the data processing is permitted by the password control section.

According to a fifth aspect of the present invention, there is provided a portable computer system which comprises: an input section for inputting at least a password; a main processor section for controlling the operation of the system to perform a data processing; and a password control section, holding one or more registered passwords as being unreadable by direct access from the main processor section, for allowing the main processor section to perform the data processing when a password identical to one of the registered passwords held therein is input by the input section, wherein the main processor section includes an operation lock section for locking and unlocking the operations of the input section and other predetermined hardware resources during the data processing, the inputting of a password is excepted from the operation lock on the input section, and the password control section holds one or more second registered passwords in addition to the first registered passwords to allow the unlocking of the locked operations when a password identical to one of the second registered passwords is input by the input section during the operation lock.

According to a sixth aspect of the present invention, there is provided a portable computer system which comprises: an input section for inputting at least a password; a main processor section for controlling the operation of the system to perform a data processing; a password control section, holding one or more registered passwords as being unreadable by direct access from the main processor section, for allowing the main processor section to perform the data processing when a password identical to one of the registered passwords held therein is input by the input section; and a secondary power-supported system memory, for storing processing state data obtained when the data processing is interrupted, wherein the password control section includes a nonvolatile password memory for storing one or more registered passwords, and a password checking section for checking whether the input password coincides with any one of the registered passwords stored in the password memory, and the main processor section includes a setup section for setting up a system configuration with respect to available functional modes and hardware resources, a supply section for supplying a password checking request to the password checking section when a power source is switched on in a power-on password check mode, a suspension section for interrupting the data processing and saving the registered password which is detected to coincide with an input password during the password checking necessary for allowing the data processing to proceed, along with the processing state data in the system memory when a main power source is switched off in a resume mode, and resume means for restoring the saved processing state data when the main power source is switched on in the resume mode, and the password checking means includes checking section for checking whether an input password coincides with the registered password saved in the system memory, when a password checking request is supplied from the main processor section in the resume mode.

According to the invention, it becomes more difficult for unauthorized users to obtain secret information from the computer system. Therefore, the reliability of the security function can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a block diagram showing the whole system construction of the portable computer;

FIG. 3 is a block diagram showing a main portion of the portable computer computer shown in FIG. 2;

FIG. 5 is a diagram for explaining the passwords and 'access right' data stored in an EEPROM shown in FIGS. 2 and 3;

FIG. 7 is a diagram showing a control logic circuit which operates according to the 'access right' data stored in a security register of the PCMCIA gate array shown in FIGS. 2 to 4;

FIG. 12 is a block diagram showing a fourth essential construction of the portable computer shown in FIG. 2;

DETAILED DESCRIPTION OF THE PREFERRED EMBODIMENTS

A portable computer according to one embodiment of the present invention will be described below with reference to the drawings.

Figures 1A, 1B:
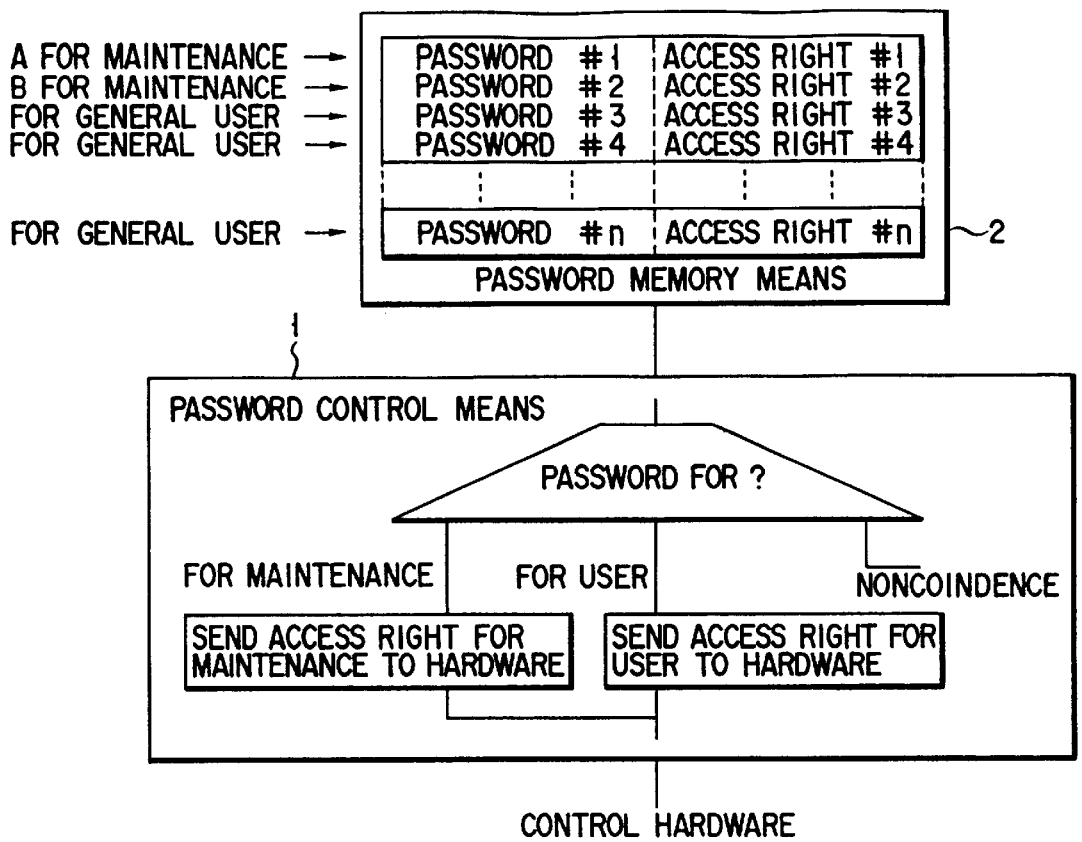
FIG. 1A is a block diagram showing a first essential construction of a portable computer according to one embodiment of the present invention.
FIG. 1B is a diagram showing an example of various passwords and 'access rights' data provided according to types of the passwords.

FIG. 1A is a block diagram showing an essential construction of the portable computer.

This portable computer includes password memory means 2A for storing a plurality of registered passwords along with 'access right' data assigned to the registered passwords, and password control means 1A for checking whether an input password coincides with registered passwords. Registering, deleting, and updating of passwords and access right data are effected under the control of the password control means 1A. The password control means 1A has a function of retrieving from the password memory means 2A the access right data assigned to the registered password which is detected to coincide with the input password, and changing the setup system configuration with respect to hardware resources provided in the personal computer.

More specifically, the password control means 1A responds to a password control command generated in a setup process or generated as a MS-DOS command in order to perform its control operation. When registration of passwords is requested by the password control command, input passwords and input access right data assigned to the input passwords are stored in the password memory means 2A. In a case where the password memory means 2A has memory areas storing six pairs of passwords and access right data, two memory areas are provided for maintenance passwords and four memory areas are provided for four user passwords, for example. The access right data assigned to the user password represents a device access right which permits access to peripheral devices selected from the available hardware resources, and the access right data assigned to the maintenance password represents a system access right which permits access to the peripheral devices and other available hardware resources.

Further, when checking of an input password is requested by the password control command, the password control means 1A checks whether an input password coincides with any one of the registered password stored in the password memory means 2A to determine the validity of the input password. After detecting the validity of the input password, the password control means 1A controls a hardware control section based on the access right data assigned to the registered password which is detected to coincide with the input password. If the detected password is a user password, the hardware control section selectively enables accessing of the various peripheral devices such as an HDD, an FDD, a serial port, a printer port, a PCMCIA specification card, and the like. On the other hand, if the detected password is a maintenance password, the hardware control section selectively enables accessing of the aforementioned peripheral device and other hardware resources such as a flash memory for storing a BIOS program, the password memory means 2A, and the like.

In the personal computer described above, a plurality of passwords are provided for hardware maintenance persons and users as shown in FIG. 1B, and a functional range of the data processing is restricted when the input password coincides with a user password. On the other hand, the functional range is not restricted when the input password coincides with a maintenance password. Thus, the maintenance is facilitated and the reliability of the security function can be improved.

The detailed construction of the portable computer will be described below.

Figure 4:
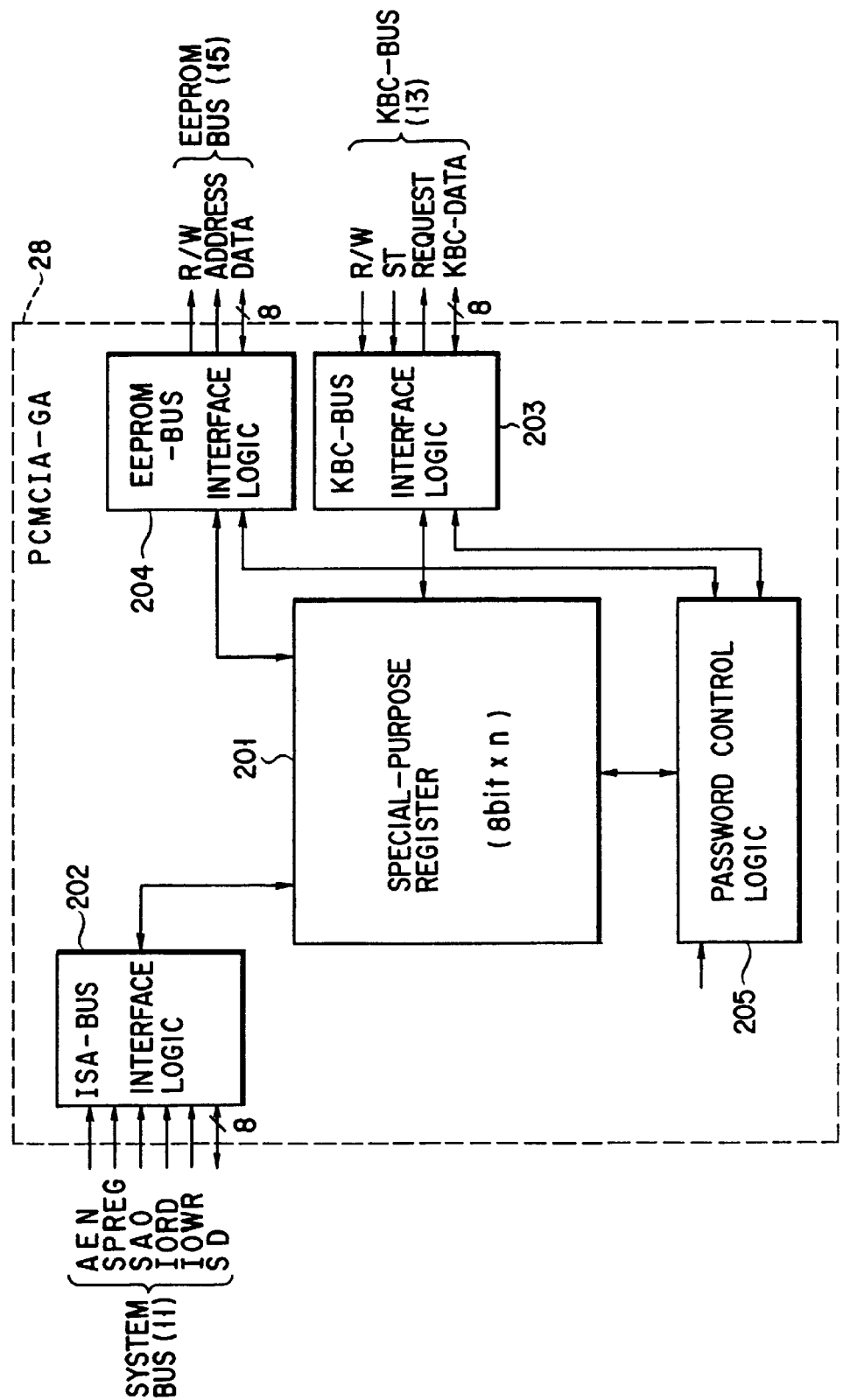
FIG. 4 is a block diagram showing an internal construction of a PCMCIA gate array shown in FIGS. 2 and 3.

FIG. 2 shows the whole system construction of the portable computer, FIG. 3 shows a main portion of the portable computer computer, and FIG. 4 shows an internal construction of a PCMCIA gate array shown in FIGS. 2 and 3.

In FIG. 2, the password control means 1A shown in FIG. 1A is realized by a keyboard controller (KBC) 30 and a register group provided in a PCMCIA gate array (PCMCIA-GA) 28. The password memory means 2A is realized by an EEPROM 29 coupled to the keyboard controller (KBC) 30 through the PCMCIA gate array (PCMCIA-GA) 28. In this computer, a command and its parameter from a CPU 21 to the keyboard controller (KBC) 30 and a response (data/status) from the keyboard controller (KBC) 30 to the CPU 21 are transferred via data communication registers in a status LCD control gate array (SLCDC-GA) 26. Data and address are transferred from the PCMCIA gate array (PCMCIA-GA) 28 to the EEPROM 29 via a memory bus 15.

This portable computer is of a laptop type or note-book type personal computer, and has a system bus (ISA-BUS) 11 of an ISA (Industry Standard Architecture) specification, a high speed graphic transfer peripheral interface bus (PI-BUS: Peripheral Interface BUS) 12, a keyboard interface bus (KBC-BUS) 13 and a power source interface bus (PSC-BUS) 14.

The CPU 21 and an I/O controller (I/O-CONT) 22 are connected to the system bus (ISA-BUS) 11. The CPU 21 and the I/O controller 22 are respectively formed of a microprocessor 80386SL and its family chip 82360SL manufactured and sold by Intel Co. (in the USA).

The overall system is controlled by the CPU 21 to perform a data processing corresponding to the program stored in a system memory 23. The CPU 21 performs an initializing process (IRT process), a resuming process, and an operation unlocking process after the system power source is switched on. In the processes, password control commands (a power-on password status command, a power-on password mode command, an operation lock password status command, an operation lock password mode command, etc.) are issued from the CPU 21 and sent to the keyboard controller (KBC) 30 via data communication register (CR) of the status LCD control gate array (SLCDC-GA) 26 shown in FIG. 3. The details of the password control command will be described later.

The CPU 21 sends a password registration verify command (power-on password status command) to the keyboard controller (KBC) 30 via the data communication register (CR) of the status LCD control gate array (SLCDC-GA) 26 shown in FIG. 3 in the initialization process (IRT process) at the time of system power-on. When the registration of the passwords (the number of registered passwords≠0) is verified by a response content (the number of registered passwords) from the keyboard controller (KBC) 30 upon issuing of the command, password input message data is sent to a VGA controller 32 by the BIOS calling to display a password input requesting message on an LCD panel 49, and the power-on password mode command is also sent to the keyboard controller (KBC) 30 via the data communication register (CR) of the status LCD control gate array (SLCDC-GA) 26. Then, completion of inputting of the passwords is waited.

Upon receipt of the password registration verify command from the CPU 21, the keyboard controller (KBC) 30 returns the number of the registered passwords as a response to the CPU 21. Further, upon receipt of the power-on password command, the keyboard controller (KBC) 30 checks whether an input password coincides with any one of the registered passwords stored in the EEPROM 29, and returns one of an ACK code and a RESEND code. The ACK code is returned when it is detected that the input password coincides with one of the registered passwords and a RESEND code is returned when it is detected that the input password does not coincide with any one of the registered passwords. The ACK code includes data representing the coincident password location in the EEPROM 29 and a status "00h". The RESEND code includes data "FFh" and status "01h" representing that no coincident password exists. After returning an ACK code or RESEND code, the keyboard controller (KBC) 30 finishes the aforementioned password control command process.

When a hot key (Fn+F1) is operated during a normal data processing, an SMI interruption is supplied to the CPU 21 via the data communication register (CR) of the status LCD control gate array (SLCDC-GA) 26, as an operation lock designating signal. Upon receipt of the SMI interruption, the CPU 21 issues an operation lock password mode command to a power supply controller (PSC) 46 and the keyboard controller (KBC) 30 via the data communication register (CR) of the status LCD control gate array (SLCDC-GA) 26. In response to the mode command, the keyboard controller (KBC) 30 inhibits transmission of a scan code (or key input data) to the CPU 21. The power supply controller (PSC) 46 stops the power supplied to the display 49. Control of an operation lock is performed in this way. In the operation lock, input signals from a keyboard 51 and a mouse are ignored, and all the display data on the screen is cleared.

This operation lock can be unlocked by inputting an operation password from the keyboard 51. The keyboard controller 30 performs a password checking on the input password to supply an unlock designating signal. The password checking is started when a special function key (e.g., "Enter" key) is detected to be operated after a string of the password characters is input from the keyboard (KB) 51. In the password check, the keyboard controller (KBC) 30 checks whether the input password coincides with any one of the registered passwords stored in the EEPROM 29, and transmits to the CPU 21 an unlock code when absence of registered passwords or the coincidence is detected. When the coincidence is detected, the unlock code includes data representing the coincident password location in the EEPROM 29 and status "00h". When absence of registered passwords is detected, the unlock code includes data "00h" and status "00h". Thereafter, the keyboard controller 30 performs a normal key-inputting process. The CPU 21 unlocks the operation lock in response to the unlock code. That is, the CPU 21 sends the operation lock unlocking command to the power supply controller (PSC) 46 and the keyboard controller (KBC) 30 via the data communication register (CR) of the status LCD control gate array (SLCDC-GA) 26, restarts input receiving of the keyboard, the mouse, and causes the display data to be displayed on a screen again.

The CPU 21 has a power managing function for low power consumption to reduce power of various I/O at the time of idling. The power managing function is enabled by an interruption known as a "System Management Interrupt (SMI)".

The interruption of the CPU 21 includes, in addition to the SMI, a Non-Maskable Interrupt (NMI) and a Maskable Interrupt (INTR).

The SMI is one type of the non-maskable interrupt, a hardware interrupt of highest priority higher than the above-described NMI and the INTR, and started by enabling for the interrupt request input SMI of the CPU 21. Similarly, the non-maskable interrupt and the maskable interrupt can be started by enabling interrupt requests of NMI, INTR (not shown) input to the CPU 21.

The interruption by the SMI is used not only for enabling the function of the operation lock by the above-described hot key operation but also for enabling the process regarding other hot key operation or the process for power management.

The I/O controller 22 is a special-purpose logic for realizing CPU and memory support functions, and controls an I/O device to be connected to a serial port 41 and an external printer to be connected to a printer port (EPP: Enhanced Printer Port) 43. The I/O controller 22 includes two DMA controllers for controlling a direct memory access, two interrupt controllers (PIC: Programmable Interrupt Controller), two timers (PIT: Programmable Interrupt Timer), two serial I/O controllers (SIO: Serial Input/Output Controller) and one real time clock (RTC: Real Time Clock). The real time clock is a timepiece module having a battery for its operation and has a static RAM (hereinafter referred to as a "CMOS memory") of a CMOS type to which power is always supplied from the battery. This CMOS memory is used for storing various data such as data indicating the system configuration setup with respect to the available functional modes and hardware resources of the computer system.

A communication between the CPU 21 and the I/O controller 22 is performed via the system bus (ISA-BUS) 11 or special-purpose interface lines provided between the CPU 21 and the I/O controller 2. Interface signals between the CPU 21 and the I/O controller 22 include, for example, a signal for controlling the SMI function of the CPU 21.

More particularly, an active row SMI signal from the I/O controller 22 or the status LCD control gate. array (SLCDC-GA) 26 is supplied to the interrupt request input SMI of the CPU 21 via an AND gate Gl. The SMI signal from the status LCD control gate array (SLCDC-GA) 26 is generated for requesting the CPU 21 to perform a hot key process to be described later. The SMI signal from the I/O controller 22 is generated when power reduction of I/O devices is detected to be necessary on the basis of an elapse of time monitored by a timer, for example.

The hot keys are keys which can directly requesting special functions such as a setup function in which the CPU 21 sets and alters a system configuration with respect to the available functional modes and hardware resources. Several keys on the keyboard 51 are assigned to the hot keys. The CPU 21 is enabled to perform a hot key process for the setup function immediately after a corresponding hot key is operated. In this hot key process, normal transmission in which key data is transmitted via the system bus (ISA-BUS) 11 is disabled. Instead, the SMI is issued to the CPU 21 so that key data indicating a hot key operation is rapidly transmitted to the CPU 21 via the keyboard interface bus (KBC-BUS) 13 and the status LCD control gate array (SLCDC-GA).

The CPU 21 includes a power save mode switching function, a resume/boot mode switching function, an LCD/CRT display switching function, and an LCD panel black/white inversion display function, each of which can be called by hot keys. These functions are defined by various routines included in a Basic Input and output System program stored in the BIOS-ROM 25. The various routines are selected in a hot keying routine which is executed in response to the SMI. Since the hot keying routine is a memory resident type program, a function corresponding to the depressed hot key can be immediately called even during active execution of an application program. In this case, it does not affect any influence to the active execution of the application program.

Hot keys can be operated to directly call functions of the keyboard controller (KBC) 30, the power supply controller (PSC) 46, the PCMCIA gate array (PCMCIA-GA) 28, and the hardware other than the CPU 21. The keyboard controller (KBC) 30 has a function of setting an "Arrow" mode in which some keys are overlaid on the arrow keys in the keyboard 51, a function of setting a "Numeric" mode in which some keys are overlaid on the ten-keys on the keyboard 51, and a function of setting a "Scroll Lock" mode. The power supply controller (PSC) 46 has a function of regulating the contrast and intensity of the LCD panel 49, and a function of controlling the volume of a speaker (not shown). The PCMCIA gate array (PCMCIA-GA) 28 has a function of locking and unlocking the operations of the available hardware resources, as an "instant security" function.

The local bus of the CPU 21 is connected to the system memory 23 and a DRAM card 24 of an option. The system memory 23 serves as a main memory in the computer system and stores an application program and data to be processed. The system memory 23 has a storage capacity of 4M bytes as a standard. The DRAM card 24 serves as an extended memory in this computer system, and optionally connected to a special-purpose card slot of 88 pins provided at the computer body. The DRAM card 24 has a storage capacity selected from 2M bytes, 4M bytes, 8M bytes and 16M bytes.

The system bus (ISA-BUS) 11 is connected to the BIOS-ROM 25. The BIOS-ROM 25 stores a Basic Input and output System program and formed of a flash memory (FLASH MEM) so that the BIOS program can be modified. The BIOS program includes a routine for initializing at the time of power-on, a driver routine for controlling various input/output devices, routines for performing processes concerning the hot key operations, and the like.

The flash memory (FLASH MEM) serving as the BIOS-ROM 25 can be initialized only when a maintenance privilege is set as an access right in the security register of the PCMCIA gate array (PCMCIA-GA) 28, and the control will be described later.

The system bus (ISA-BUS) is connected to the status LCD control gate array (SLCDC-GA) 26, a floppy disk controller (FDC) 27, the PCMCIA gate array (PCMCIA-GA) 28, the keyboard controller (KBC) 30, an extended connector 31 detachable with an extended unit (Desk Station), and a hard disk drive (HDD) 42.

The status LCD control gate array (SLCDC-GA) 26 performs the display control of a status LCD 44, a communication with the keyboard controller (KBC) 30, and a communication with the power supply controller (PSC) 46. The status LCD control gate array (SLCDC-GA) 26 causes the status LCD 44 to display a battery residual operating time, various operation environmental states which can be set and altered in a hot key process. The status LCD 44 is a dedicated liquid crystal display used for displaying the battery residual operating time, and the various operation environmental states.

The PCMCIA gate array (PCMCIA-GA) 28 controls an access to the 68-pin PCMCIA (Personal Computer Memory Card International Association) card to be optionally mounted in slots A, B of a PCMCIA port 48 and a communication with the keyboard controller (KBC) 30. The PCMCIA gate array (PCMCIA-GA) 28 includes a logic circuit serving as an interface with the EEPROM 29 in which registered passwords are stored, and a logic circuit which operates to assure the security function. The concrete configuration of the PCMCIA gate array (PCMCIA-GA) 28 will be described later with reference to FIGS. 3 and 4.

The two slots A, B of the PCMCIA port 48 are connected to the PCMCIA gate array (PCMCIA-GA) 28. The slot A supports all types of PCMCIA cards (a thick type of 18 mm thick, a type 3 of 10.5 mm thick, a type 2 of 5.0 mm thick and a type 1 of 3.3 mm thick), and the slot B supports the PCMCIA cards of types 1 and 2. In this case, the small PCMCIA card of 5.0 mm thick or 3.3 mm thick is used for the security card.

The PCMCIA gate array (PCMCIA-GA) 28 has a security function for checking whether a password read from the security card of a PCMCIA specification coincides with any one of the registered passwords stored in the EEPROM 29 and allowing the system to start only when the coincidence is detected.

The PCMCIA gate array (PCMCIA-GA) 28 also has an instant security function for locking and unlocking the operations of hardware resources. This instant security function is realized by executing deenergization of a display screen of the LCD panel 49 and a key lock of the keyboard 51 in response to a designation upon operation of predetermined hot keys (Fn+F1) from the keyboard controller (KBC) 30.

The PCMCIA gate array (PCMCIA-GA) 28 performs a communication with the keyboard controller (KBC) 30 via the keyboard interface bus (KBC-BUS) 13 so as to receive a command of the hot key (Fn+F1) operation.

The communication between between the status LCD control gate array (SLCDC-GA) 26 and the keyboard controller (KBC) 30 and the communication between the PCMCIA gate array (PCMCIA-GA) 28 and the keyboard controller (KBC) 30 is effected via the keyboard interface bus (KBC-BUS) 13 so that various control data can be quickly transferred between the CPU 21 and the keyboard controller (KBC) 30.

More particularly, the status LCD control gate (SLCDC-GA) 26 includes a group of I/O registers for holding control data to be transferred between the CPU 21 and the keyboard controller (KBC) 30. The keyboard controller (KBC) 30 accesses the register group via the keyboard interface bus (KBC-BUS) 13. The CPU 21 accesses the register group via the system bus 11. The register group includes the data communication register (CR), a register having a bit for supplying an SMI signal to an AND gate G1, a hot key register for storing hot key data transmitted from the keyboard controller (KBC) 30.

The keyboard controller (KBC) 30 controls the internal keyboard (KB) 51 of a standard facility associated in the computer body, scans a matrix of the keys in the keyboard 51 to receive a signal corresponding to a pressed key, and converts the signal into a predetermined key code. In this case, the key code corresponding to the hot key provided on the keyboard 51 is transmitted to the status LCD control gate array (SLCDC-GA) 26 via the keyboard interface bus (KBC-BUS) 13. On the other hand, the other keys except the hot keys are transmitted to the CPU 21 by a hand-shake type serial communication via the system bus (ISA-BUS) 11 as usual. The keyboard controller (KBC) 30 also has a function of controlling a mouse 52, an external keyboard 53, and the like to be optionally connected.

The keyboard controller (KBC) 30 serves as a processor for realizing a security function.

The keyboard controller (KBC) 30 has a password control function of executing various password control commands from the CPU 21 and transmitting a response to the CPU 21 as a result of the execution. In the execution of the password control commands, the keyboard controller (KBC) 30 controls an access to the password memory 29 so as to register, update, and delete power-on passwords, access right data, and operation passwords in the password memory 29 and to perform a password checking in which a password input by the keyboard 51 is compared with the power-on passwords or the operation passwords.

The communication between the status LCD control gate array (SLCDC-GA) 26 and the power supply controller (PSC) 46 is effected via the power supply interface bus (PSC-BUS) 14 so that various control signals can be quickly transferred between the CPU 21 and the power supply controller (PSC) 46. That is, the status LCD control gate array (SLCDC-GA) 26 includes, as described above, a group of the I/O registers including a data communication register (CR) for storing control data to be communicated between the CPU 21 and the power supply controller (PSC) 46. The power supply controller (PSC) 46 accesses the register group via the power supply interface bus (PSC-BUS) 14. The CPU 21 accesses the register group via the system bus 11. The hot key process of the power supply controller (PSC) 46 is enabled by reading key data stored in the hot register of the status LCD control gate array (SLCDC-GA) 26 via the power supply interface bus (PSC-BUS) 14.

The floppy disk controller (FDC) 27 controls a dual mode floppy disk drive (FDD) 45 for driving a 3.5-inch disk of 750K or 1.44M bytes, and includes a variable frequency oscillator (VFO).

The extended unit (Desk Station) can be connected to an extended connector 31. various extended boards such as a communication board are mounted in the extended unit to extend functions. The hard disk drive (HDD) 42 includes an IDE (Integrated Drive Electronics) interface, and is controlled to be accessed directly by the CPU 21. The hard disk drive (HDD) 42 drives a 2.5-inch hard disk having a storage capacity of 120M or 200M bytes.

The peripheral interface bus (PI-BUS) 12 is connected to the display controller (hereinafter referred to as a "VGA controller") 32 prepared according to VGA (Video Graphic Array) specification. The VGA controller 32 controls a standard monochrome/color LCD panel 49 of a backlighting type and an optional color CRT 50. A video memory (VRAM) 33 stores video data transferred from the CPU 21 via the peripheral interface bus (PI-BUS) 12 to the VGA controller 32. Since the system bus (ISA-BUS) 11 is not used for transferring the video data, performance of the system is not reduced at this time. Intensity and contract of the LCD panel 49 can be adjusted by the hot key operation in the keyboard 51.

Further, this system also includes the power supply controller (PSC) 46 and a power supply circuit (PS) 47. The power supply controller (PSC) 46 controls a power source voltage supplied from the power supply circuit 47 to each unit in accordance with a command from the cPU 21, and performs a communication to the CPU 21 via the power supply interface bus (PSC-BUS) 14 and the data communication register (CR) of the status LCD control gate array (SLCDC-GA) 26. The power supply controller (PSC) 46 performs a hot key process for adjusting the intensity and contrast of the LCD panel 49, the volume of a speaker, and the like according to key data set in the hot key register of the status LCD control gate array (SLCDC-GA) 26. The power supply circuit 47 produces an internal power source voltage of a predetermined level from an external power source voltage supplied via a built-in battery or an AC adapter to supply it to each unit within the computer system. The power supply circuit 47 produces a backup power source voltage (BK) to be supplied to the units requiring a backup power when the system power switch is off.

The EEPROM 29 is connected to the PCMCIA gate array (PCMCIA-GA) 28 via a memory bus 15 having address and data lines, and accessed under the control of the keyboard controller (KBC) 30. In this EEPROM 29, six sets of a power-on password, access right data, and operation password can be stored at a maximum. Two sets are provided for maintenance persons, and four sets are provided for users. The features of these passwords and the access right will be described later.

Access to the EEPROM 29 is controlled by the PCMCIA gate array (PCMCIA-GA) 28. When a supervisor privilege is set as an access right to the security register of the PCMCIA gate array (PCMCIA-GA) 28, access to all the memory areas of the EEPROM 29 is enabled for registering, updating, and deleting passwords and access right data. When a password updating right is set, access to all the memory areas of the EEPROM 29 is enabled for updating passwords. These controls will be described later.

The access right data assigned to the power-on passwords may represent an access right (device access right) to the above-described input/output devices such as the serial port 41, the hard disk drive (HDD) 42, the printer port (EPP) 43, the floppy disk driver 9FDD) 45, and the PCMCIA port 48.

An example of the PCMCIA gate array (PCMCIA-GA) 28 is shown in FIGS. 3 and 4.

As shown in FIGS. 3 and 4, the PCMCIA gate array (PCMCIA-GA) 28 includes a security register (SR) in which a one-byte access right is set, a special-purpose register group 201 having n pieces of 8-bit registers including a plurality of EEPROM access control registers (MR) for controlling to access the EEPROM 29, an ISA-BUS interface logic 202 coupled to the system bus (ISA-BUS) 11, a KBC-BUS interface logic 203 coupled to the keyboard interface bus (KBC-BUS) 13, an EEPROM interface logic 204 coupled to a special-purpose line 15 of the EEPROM 29, and a password control logic 205 for controlling the interface logics 202, 203, and 204.

The ISA-BUS interface logic 202 interfaces with the system bus (ISA-BUS) 11, and controls the access to the special-purpose register group 201 in response to a request from the CPU 21. In this control, the interface logic 202 uses an address enable signal (AEN), a special-purpose register designation signal (SPREG), a system address signal (SAO), an I/O read signal (IORD), an (I/O write signal (IOWR) and data of 8-bit system data bus (SD), which are supplied via the system bus 11 from the CPU 21.

The KBC-BUS interface logic 203 controls the access to the special-purpose register group 201 in response to a request from the keyboard controller (KBC) 30. In the control, the interface logic 203 uses a read/write signal (R/W), a strobe signal (STROB), and address/data of 8-bit KBC data line in the keyboard interface bus (KBC-BUS) 13, which are supplied from the keyboard controller (KBC) 30 via the keyboard interface bus (KBC-BUS) 13. The KBC-BUS interface logic 203 outputs, so as to notice data set in the register by the CPU 21 to the keyboard controller (KBC) 30, a request signal (REQUEST) to the keyboard controller (KBC) 30 via the keyboard interface bus (KBC-BUS) 13.

The EEPROM interface logic 204 sends the address (Address) and the read/write (R/W) signal according to setting of the EEPROM access control register (MR) via the memory bus under the control of the keyboard controller (KBC) 30, and reads/writes data (password character string) in the EEPROM 29.

Figure 6:
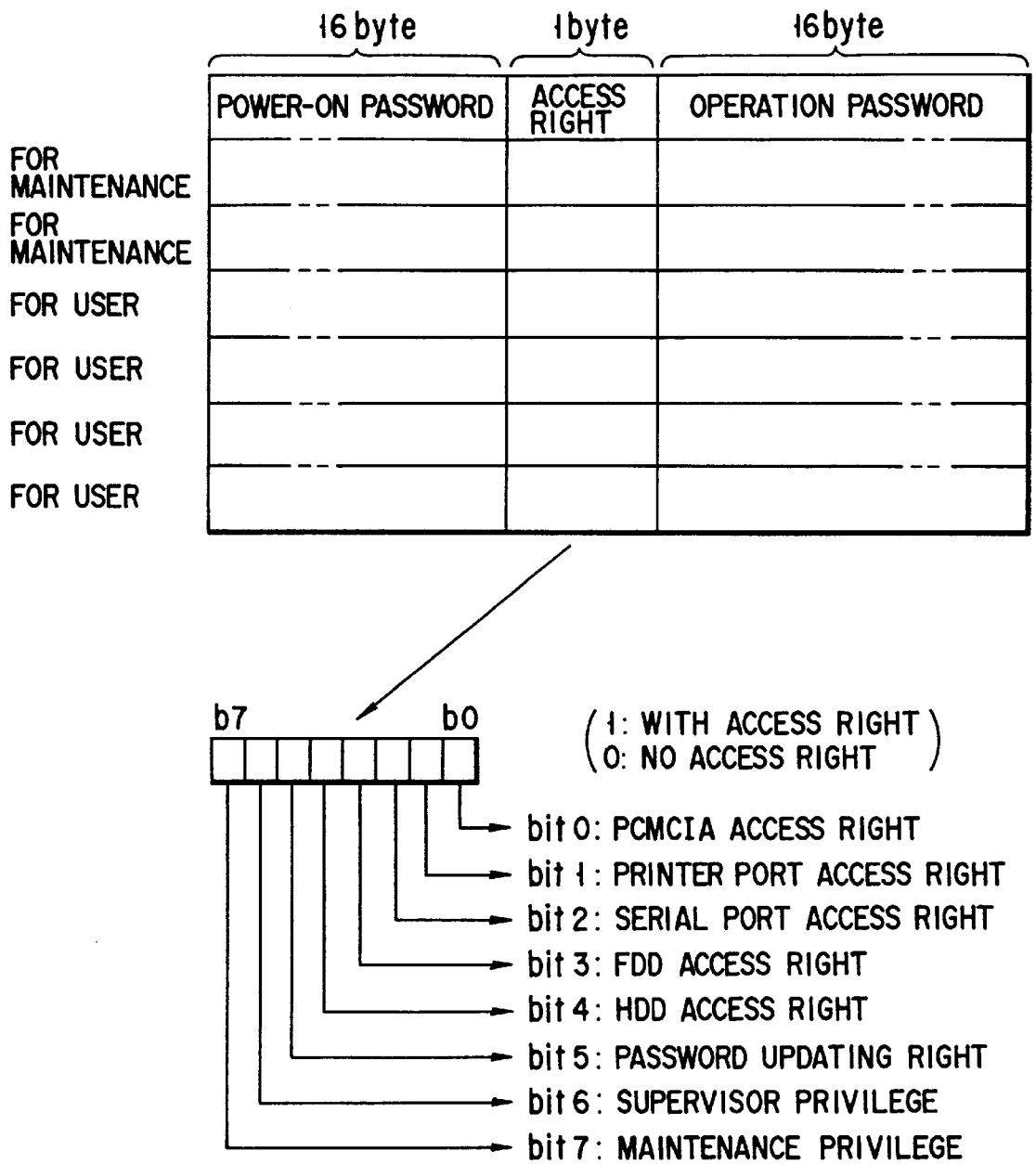
FIG. 6 is a memory map of the EEPROM shown in FIGS. 2 and 3.

The contents and the structures of the passwords and the access right to be stored in the EEPROM 29 are shown in FIGS. 5 and 6, and a control example of the access right to be set to the security register (SR) 100 of the PCMCIA gate array (PCMCIA-GA) 27 is shown in FIG. 7.

Figure 8A:
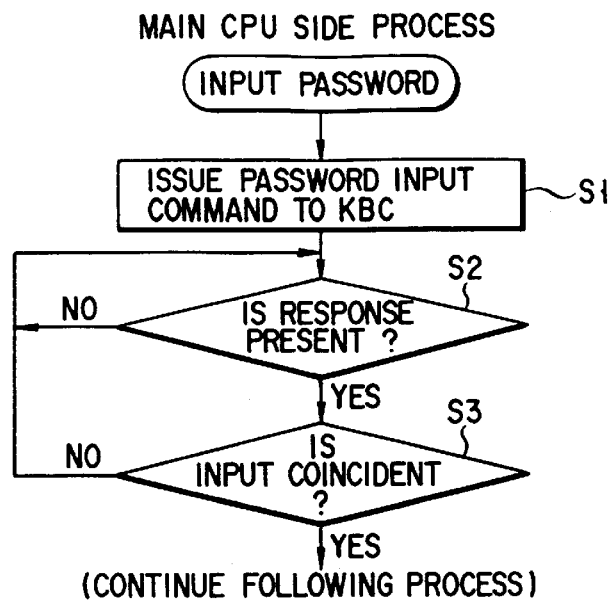
FIGS. 8A and 8B are flowcharts for explaining processes which a CPU and keyboard controller shown in FIG. 2 perform in a power-on password check mode, respectively.
Figure 8B:
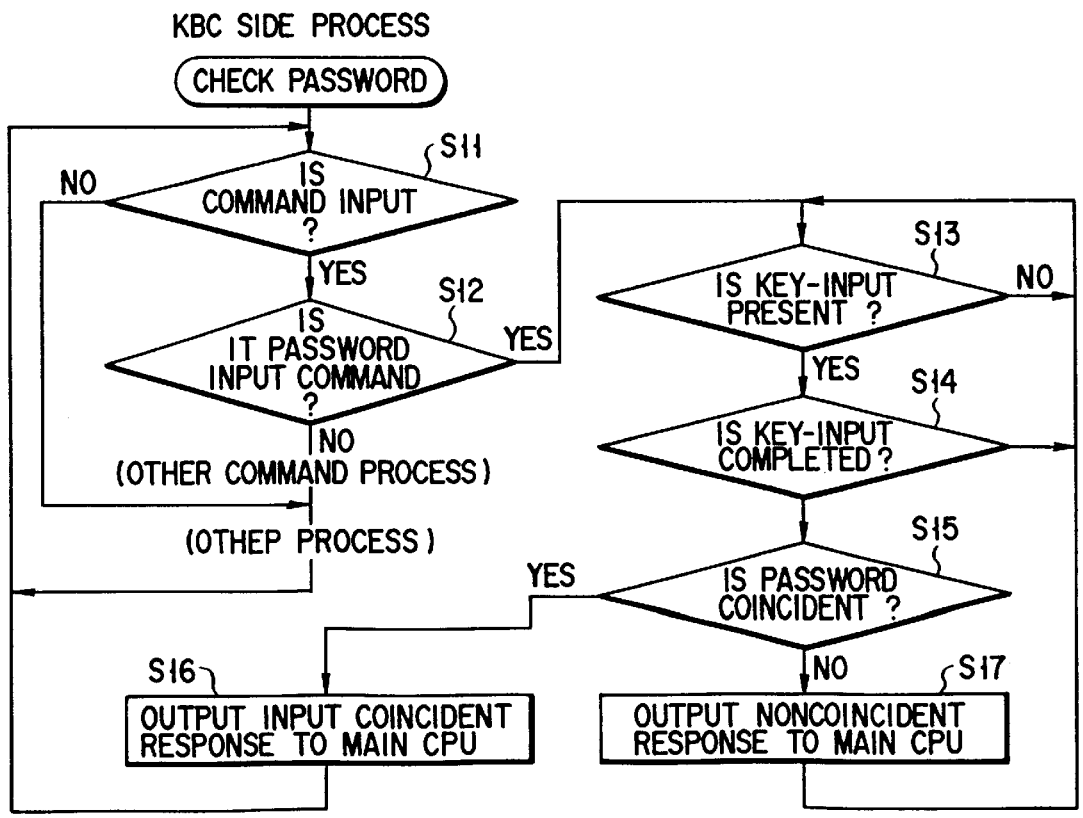
Figure 9:
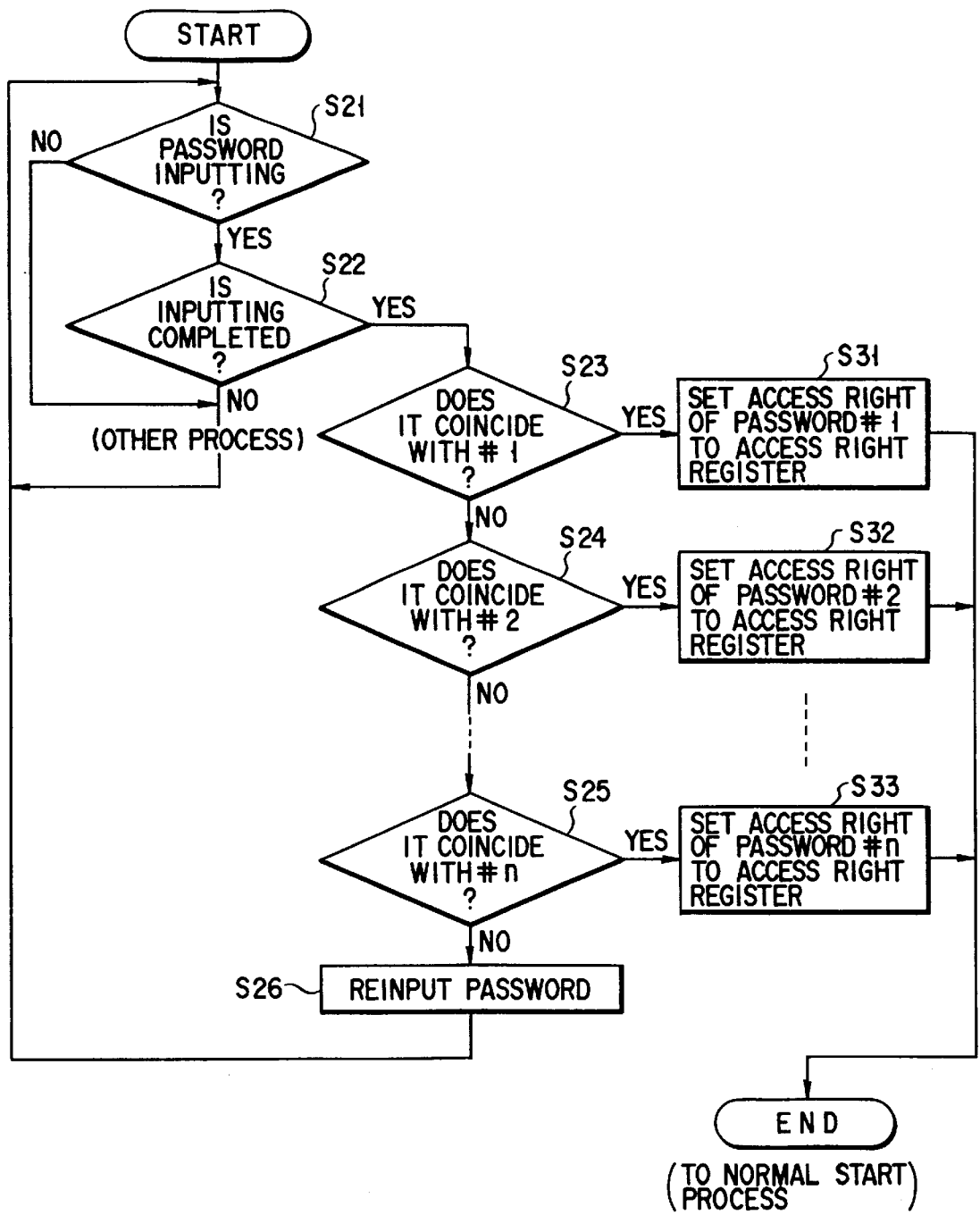
FIG. 9 is a flowchart for explaining a power-on password checking process performed by the keyboard controller in the power-on password check mode in a case where 'access right' data are stored with passwords in the EEPROM shown in FIGS. 2 and 3.

Processing sequence of checking the passwords concealed from the system side, i.e., checking the passwords to be executed via a rear bus under the control of the keyboard controller (KBC) 30 at the sides of the CPU 21 and the keyboard controller (KBC) 30 is shown in FIG. 8, and processing sequence of setting the access right of checking the passwords (checking power-on passwords) is shown in FIG. 9.

The features of the security function by checking the passwords in the embodiment of the present invention will be described with examples.

In the embodiment of the present invention, operators using the portable computer are divided into ranks (groups), different passwords are respectively applied to the ranks (groups), and device access rights suitable for the ranks are assigned to the passwords. Therefore, the reliability of the security function can be improved.

The support of the password and the password control command of the embodiment will be described.

The security function of this embodiment includes a power-on password checking function and an operation password checking function.

Power-on passwords and operation passwords are stored in the EEPROM 29 coupled directly to the keyboard controller (KBC) 30 under the access control of the keyboard controller (KBC) 30. Checking of the passwords (comparing, determining characters) and setting of the access right are performed by the keyboard controller (KBC) 30. The passwords stored in the EEPROM 29 are not read via the system bus by the above-described rear bus function.

In order to process the passwords, a "password control command" is provided in this embodiment.

The "password control command" is sent from the CPU 21 to the keyboard controller (KBC) 30 via the data communication register (CR) of the status LCD control gate array (SLCDC-CA) 26.

Command/parameter from the CPU 21 to the keyboard controller (KBC) 30 are written in a first data communication register (CR-a) in the special-purposed register group (corresponding to the special-purposed register group 201 of the PCMCIA gate array 28) provided in the status LCD control gate array (SLCDC-GA) 26. In order to notice it to the keyboard controller (KBC) 30, the CPU 21 sets the predetermined bit of a second data communication register (CR-b) to "1", thereby issuing a request signal (REQUEST) to the keyboard controller (KBC) 30.

The command/parameter are distinguished by the value of the predetermined bit of a third data communication register (CR-c).

The keyboard controller (KBC) 30 determines, when receiving the request signal (REQUEST), whether the data signal is the command or the parameter from the value of the predetermined bit of the third data communication register (CR-c) of the status LCD control gate array (SLCDC-GA) 26, and reads data (command/parameter) stored in the first data communication register (CR-a). Then, the keyboard controller (KBC) 30 clears the predetermined bit of the second data communication register (CR-b) to "0" to complete receiving. In a case where the data is formed of a plurality of bytes, the reading sequence of the data is repeated.

A response (parameter) from the keyboard controller (KBC) 30 to the CPU 21 is transmitted by setting "data" of 1 bite and "status" of 1 byte.

In the case of transmission, the "data" is written in fourth data communication register (CR-d) of the special-purposed register group (corresponding to 201) provided in the status LCD control gate array (SLCDC-GA) 26, the "status" is written in fifth data communication register (CR-e), and in order to notice it to the CPU 21, a predetermined bit of sixth data communication register (CR-f) is set to "1".

The CPU 21 reads, when the predetermined bit of the sixth data communication register (CR-f) is "1", the values (data status) of the fourth data communication register (CR-d) and the fifth data communication register (CR-e), and clears the predetermined bit of the sixth data communication register (CR-f) to "0".

As described above, the data communication is executed between the CPU 21 and the keyboard controller (KBC) 30.

As shown in FIG. 6, six sets of a power-on password, access right data, and operation password can be stored at a maximum in the EEPROM 29 to be accessed by the keyboard controller (KBC) 30. Two sets are provided for maintenance persons, and four sets are provided for users.

Selection of presence or absence of checking the power-on password and registering/updating/deleting of the password can be executed on a setup screen. In this case, "no password check" is set, the system is started similarly to a normal system having no password checking function. In the case of "password check" is set, inputting of the password is requested in an initializing process and in a resume process performed at the time of power-on, and the system is started when the input password is accepted.

When the "password check" is set by the setup, the power-on password stored in the EEPROM 29 is referred by a password checking process in the initializing process performed at the time of power-on. If the key-input password does not coincide with any one of the power-on passwords stored in the EEPROM 29, the system is not started. However, when the user passwords are not registered as the power-on passwords, the power-on password check is not executed ("supervisor privilege" is applied as the access right at this time).

Four user passwords can be registered as the power-on passwords at a maximum (a plurality of the same passwords cannot be registered). In this case, the first password is for the supervisor, and the second and the following passwords are for ordinary user.

Registering, updating, deleting of the power-on passwords for the user use are executed by means of a special utility tool.

The access right data can be assigned to the power-on password as shown in FIGS. 5 to 7. The access right specifies a range of user operation (data processing) when the system is started by the accepted power-on password.

The access right includes the supervisor privilege, a password updating right, an HDD access right, an FDD access right, a serial port access right, a printer port access right, and a PCMCIA access right. Further, maintenance privilege which is not available for general-purposes is provided.

The power-on passwords have following limit due to the difference of the access right.

(1) maintenance privilege (bit)

The maintenance privilege has a right of accessing all the hardware resources, and is assigned only to the maintenance passwords. The maintenance privilege permits rewriting and initializing of The EEPROM 29 and BIOS-ROM 25, for example. This privilege is not liberated to ordinary users (only for maintenance). The power-on passwords having the maintenance privilege are limited to two. The setting is executed by a utility tool such as T&D. If the maintenance privilege is not provided, a write signal of the BIOS-ROM 25 is disabled.

(2) Supervisor privilege (bit 6)

The supervisor privilege has a right of accessing hardware resources restricted in comparison with the maintenance privilege. The supervisor privilege permits registering, updating deleting all the user passwords and the access right including itself in the EEPROM 29.

The supervisor privilege is set to the initial user password by means of a utility tool. The supervisor privilege can be set to the second and following passwords. The passwords having the supervisor privilege can be registered updated deleted for all the user passwords. That is, the supervisor privilege does not permit rewriting of the BIOS-ROM 25 formed of the flash memory (FLASH MEM). Further, registering of other user passwords and access rights is permitted.

(3) Password updating right (bit 5)

The password updating right provides a right of updating own password, but cannot update other passwords. The password updating right is a right of whether the power-on password is enabled or disabled for updating. If the power-on password is disabled, the own password cannot be updated by setup or updating the power-on password (the keyboard controller (KBC) 30 rejects the command).

In a case where the supervisor privilege has no password updating right, registering, updating and deleting of the passwords are not permitted.

When the password updating right is provided, the password can be updated after the registered password to be updated is input and new password is described continued to "/". In this case, the passwords are compared by power-on password check command included in the password control command.

(4) HDD access right (bit 4)

(5) FDD access right (bit 3)

(6) Serial port access right (bit 2)

(7) Printer port access right (bit 10)

(8) PCMCIA access right (bit 0)

The HDD access right, the FDD access right, the serial port access right, the printer port access right, and the PCMCIA access right are rights of accessing to a corresponding hardware resource. A disabled hardware resource is can cannot be accessed (in this case, it is excluded from a system configuration list). When the HDD access right is not enabled (when "1" is not set to bit 4 (b4) of the security register (SR) 100, chip selects of the hard disk drive (HDD) 42 are all disabled under the control of the hardware by the security register (SR) 100. When the FDD access right is not enabled (when "1" is not set to bit 3 (b3) of the security register (SR) 100), a motor-on signal of the floppy disk drive (FDD) 45 is disabled. When the serial port access right is not enabled (when "1" is not set to bit 2 (b2) of the security register (SR) 100), transmission data SD and reception data RD of the SIO of the serial port 41 are disabled. When the printer port access right is not enabled (when "1" is not set to bit 1 (b1) of the security register (SR) 100), the chip select of the control chip of the printer port 43 is disabled. When the PCMCIA access right is not enabled (when "1" is not set to bit "0" (b0) of the security register (SR) 100), the chip select of the control chip of the PCMCIA port 48 is disabled.

In order to avoid a defective state that the system operation can not be started, it must be confirmed by a utility tool that any one of the HDD and the FDD is enabled by the corresponding device access right.

In the power-on password mode, the power-on password is input and checked. A process of the power-on password mode is executed by "power-on password mode command" of the password control command. At the time of resuming, when the password location is designated by the parameter, check of the password is executed only for the designated password.

In order to enable for inputting the password during active execution of the power-on password input mode, the keyboard (KB) 51 is key-scanned, but the mouse 52 is inhibited for communication. In this case, transmission of the key-scan data is not executed for the CPU 21.

When coincidence of the passwords is obtained by checking the passwords of the power-on passwords, the access right data assigned to the password is retrieved from the EEPROM 29 and set to the security register (SR) 100 of the PCMCIA gate array (PCMCIA-CA) 28. In this case, the keyboard controller (KBC) 30 transmits "coincident password location" as data and "00h (normal end)" as status to the CPU 21, and returns to the normal key inputting after the data and the status are transmitted.

If the coincident password does not exist, the input string of password characters is cleared, "FFh (abnormal end)" as data and "01h (no coincident password)" as status are transmitted, and again password input queues after the transmission. That is, it is not returned to the normal key input until inputting of the password is normally ended.

The embodiment of the present invention includes an instant security function.

The instant security function can lock the keyboard and display (operation lock) by the operation of hot keys (Fn+F1) during active execution of the application.

Key-inputting of the keyboard (KB) 51 and the external keyboard are ignored in the operation lock state, and PS/2 mouse 52 is disabled. In this case, the keyboard controller (KBC) 30 receives the key-input so as to enable for inputting the passwords, but inhibits to output to the system bus (ISA-BUS) 11. Simultaneously, the displays of the LCD panel 49 and the external CRT are all erased. In this case, VGA controller 32 and the video memory (VRAM) 33 can be accessed.

It is necessary to input the passwords (operation passwords) from the keyboard (KB) 51 so as to unlock the operation lock state. In this case, all the input character string and the number of characters are not displayed on the screen. The inputting of the passwords is ended by finally depressing the [Enter] key. The string of characters immediately before the [Enter] key is to be compared with those of the registered passwords, and the character string is discarded in the case of noncoincidence. In this case, new comparison is started from the character input after the [Enter] key is operated. Even if the character string is coincident, the lock is not unlocked until the [Enter] key is pressed. When the code of the [Enter] key is placed before and after the correct password, the lock can be reliably unlocked. In the case of no password, it is processed as regarded "character string=Null (vacant)". That is, the operation lock is unlocked only by the operation of the [Enter] key.

An operation password for the instant security can be set separately from the power-on password. The operation password is stored in the EEPROM 29 for each power-on password (i.e., each user). A default password is set to the same as the power-on password.

Registering, updating, and deleting of the passwords for instant security (operation password) are executed in the setup process.

As shown in FIG. 6 and 7, the password (operation password) for unlocking the operation lock is stored together with the power-on password and the access right in the EEPROM 29. The four operation passwords can be totally set corresponding to the user power-on passwords. Even if the power-on password is not set, the operation password can be set.

When the power-on password is set, data (character string) of the power-on passwords are used as the operation passwords as it is in the case of the default. If the operation password and the power-on password are different, it is checked whether the input password coincides with the operation password, and the power-on password is invalidated.

If the power-on password and the operation password are differentiated, a password setting utility is used. However, following limits exist according to a difference of access rights.

(1) An operator having the maintenance privilege or the supervisor privilege can register, update and delete all the operation passwords.

(2) An operator having the password updating right can register, update and delete his or her own operation password.

(3) An operator who does not have the above-mentioned privilege or right cannot carry out any password control operations.

The operation lock is unlocked when the password identical to the operation password is input in the operation password check mode.

In this mode, a transmission of a scan code from the keyboard controller (KBC) 30 to the CPU 21 is inhibited, and PS/2 mouse 52 is also inhibited for communication. However, since the keyboard controller (KBC) 30 key-scans the keyboard (KB) 51 so as to queue inputting of the password.

In this case, checking of the password is started after inputting of [Enter] key is executed.

Checking of the password is first executed for all input characters of a buffer. In the case of noncoincidence, the password is then checked except the initial one character, and the passwords are sequentially continuously checked until the number of the remaining characters becomes "0".

During active checking of the passwords after inputting by [Enter] key, an interrupt is inhibited in the keyboard controller (KBC) 30, and a key-input is not accepted.

In the case of checking the passwords, the operation password is first to be compared with the input password, and if the operation password is not registered, the power-on password is next to be compared with the input password.

In the case of responding to the CPU 21, when the password is not registered at all (including the power-on password), unlock of the operation lock is noticed only by inputting with the [Enter] key. If there exists no coincident password, the input buffer is cleared. Again, it becomes a password input queuing state. If the coincident passwords exist, "password location"coincident as data and "00h (normal end)" as status are transmitted to the CPU 21, and returns to normal key-inputting.

The password control commands used for the embodiment described above will be described.

The following commands are valid in the password control mode.

Power-on password status command
Power-on password check command
Power-on password+access right setting command
Power-on password+access right deleting command
Power-on password updating command
Access right updating command
Access right output command Power-on password mode command
Operation lock status command
Operation lock password check command
Operation lock password setting command
Operation lock password deleting command
Operation lock password mode command
Hot key pattern registering command
EEPROM access command The "maintenance privilege" or "supervisor privilege" is necessary as the access right to execute the power-on password+access right setting command, the power-on password+access right deleting command and the access right updating command of the above-described commands. The "maintenance privilege", "supervisor privilege" or "password updating right" is necessary as the access right to execute the power-on password updating command. The access right output command is limited in the function if the "maintenance privilege" or the "supervisor privilege" are not existent.

The keyboard controller (KBC) 30 returns, when the process for the above-described command is finished, to normal key-input process.

The keyboard controller (KBC) 30 transfers, when receiving the power-on password status command (without parameter), the status of the power-on password as data to the CPU 21.

The keyboard controller (KBC) 30 checks, when receiving the power-on password command, only the password at the time of updating the password as described above. When the passwords coincide, "password location" coincident as data and "00h (normal end)" as status are transmitted to the CPU 21, the keyboard controller (KBC) 30 returns to normal input process. When the passwords do not coincide, "FFh (abnormal end)" is transmitted as data, and the keyboard controller (KBC) 30 returns to the normal key-input process.

The keyboard controller (KBC) 30 sets, when receiving the "power-on password+access right setting command", the password and the access right. This command is received when the "maintenance privilege" or the "supervisor privilege" is provided. When the keyboard controller (KBC) 30 abnormally ends, "FFh" is transmitted as data, and the keyboard controller (KBC) 30 returns to the normal key-input process.

The keyboard controller (KBC) 30 deletes, when receiving the "power-on password+access right deleting command", the password and the access right. In this case, the corresponding operation password is deleted. When the keyboard controller (KBC) 30 normally ends, "password storage location" deleted as data and "00h" as status are transmitted to the CPU 21, and the keyboard controller (KBC) 30 returns to the normal key-input process. If the keyboard controller (KBC) 30 abnormally ends, "FFh" as data and "content of abnormal end" as status are transmitted, and the keyboard controller (KBC) 30 returns to the normal key-input process.

The keyboard controller (KBC) 30 rewrites, when receiving the power-on password updating command, only designated power-on password. This command is accepted when the "maintenance privilege" or the "supervisor privilege" or the "password updating right" is applied. In the case of the normal end, the "password setting location" updated as data and "00h" as status are transmitted to the CPU 21, and the keyboard controller (KBC) 30 returns to the normal key-input process. In the case of abnormal end, "FFh" as data and "content of abnormal end" as status are transmitted, and the keyboard controller (KBC) 30 returns to the normal key-input process.

The keyboard controller (KBC) 30 rewrites, when receiving the access right updating command, the access right of the power-on password. This command is accepted when the "maintenance privilege" or the "supervisor privilege" is applied. In the case of normal end, "password storage location" updated as data and "00h" as status are transmitted to the CPU 21, and the keyboard controller (KBC) 30 returns to the normal key-input process. In the case of abnormal end, "FFh" as data and "content of abnormal end" as status are transmitted, and the keyboard controller (KBC) 30 returns to the normal key-input process.

The keyboard controller (KBC) 30 outputs, when receiving the access right output command, the access right corresponding to the designated password storage location to the CPU 21. In the case of normal end, the "access right" read as data from the EEPROM 29 and "00h" as status are transmitted to the CPU 21, and the keyboard controller (KBC) 30 returns to the normal key-input process.

The keyboard controller (KBC) 30 transfers, when receiving the power-on password mode command, to the input mode of the power-on password. The designated password applied as parameter or undesignated password is password-checked. In order to input the password during active execution of the power-on password input mode, the keyboard (KB) 51 is key-scanned, but the mouse 52 is inhibited for communication. In this case, key-scan data is not transmitted to the CPU 21.

When the passwords coincide in the case of checking the passwords of the power-on password, the access right corresponding to the password is set to the security register (SR) 100 of the PCMCIA gate array (PCMCIA-GA) 28. In this case, "coincident password location" as data and "00h (normal end)" as status are transmitted to the CPU 21, the keyboard controller (KBC) 30 returns to the normal key-input process after the data and the status are transmitted. If there is no coincident password, the input password character string is cleared, "FPH (abnormal end)" as data and "01h (no coincident password)" as status are transmitted, and password input queue is set after the transmission. That is, the normal key-input is not returned until the password input is normally end. At the time of returning to resuming, when the password location is designated by the parameter, the password is checked only for the designated passwords.

The EEPROM 29 is accessed to read when the operation lock status command is received, and the setting state of the operation password is transmitted to the CPU 21.

When the operation lock password check command is received, the operation password designated by the parameter is checked. In the case of the normal end, "eset state information of the operation password" as data and "00h" as status are transmitted to the CPU 21, and normal key-input process is returned. In the case of abnormal end, "FFh" as data and "content of abnormal end" as status are transmitted, and normal key-input process is returned.

When the operation lock password set command is received, the EEPROM 29 is accessed according to the password storage location designated by the parameter and the password character string, and the designated operation password is set. The command is accepted when the "maintenance privilege" or the "supervisor privilege" or the "password updating right" is applied. In the case of normal end, "set password storage location" as data and "00h" as status are transmitted to the CPU 21, and normal key-input process is returned. In the case of abnormal end, "FFh" as data and "content of abnormal end" as status are transmitted, and normal key-input process is returned.

When the operation lock password deleting command is received, the operation password designated by the parameter is deleted. In the case of normal end, "location of the deleted password" as data and "00h" as status are transmitted to the CPU 21, and normal key-input process is returned. In the case of abnormal end, "FFh" as data and "content of abnormal end" as status are transmitted, and normal key-input process is returned.

When receiving the operation lock password command, the operation password input mode is transferred.

In the operation password input mode, the key-inputs of the keyboard (KB) 51 and the external keyboard are ignored, and PS/2 mouse 52 is disabled. In this case, since the keyboard controller (KBC) 30 can input the password, the keyboard controller (KBC) 30 receives the key-input but inhibits to output it to the system bus (ISA-BUS) 11. Simultaneously, the LCD panel 49 and the external CRT are all erased. In this case, the VGA controller 32 and the video memory (VRAM) 33 can be accessed. In this case, the character string, the number of the characters of the input password are not displayed on the screen at all. The last of the password is ended by [Enter] key. The character string immediately before the depression of the [Enter] key is to be compared. In the case of noncoincidence, the character string is discarded. At that time, the character input after the operation of the [Enter] key is newly started to be compared. Even if the character strings coincide, the lock is not unlocked unit the [Enter] key is pressed. In the case of no password, the operation lock is unlocked only by the operation of the [Enter] key.

Referring now to FIGS. 2 to 9, the password checking process of the embodiment of the present invention will be described.

The CPU 21 sends the password registration verify command (power-on password status command) to the keyboard controller (KBC) 30 via the data communication register (CR) of the status LCD control gate array (SLCDC-GA) 26 shown in FIG. 3 in the case of initializing (IRT process) at the time of system power-on. When registering of the password (the number of registered passwords≠0 is verified by the response content (the number of registered passwords) from the keyboard controller (KBC) 30 upon issuing of the command, the password input message data is sent to the VGA controller 32 by BIOS calling, the password input message is displayed on the LCD panel 49, and further the power-on password mode command (password input command) is sent to the keyboard controller (KBC) 30 via the data communication register (CR) of the status LCD control gate array (SLCDC-GA) 26 (step S1 in FIG. 8A).

Then, the password input is queued (step S2 in FIG. 8A).

On the other hand, the keyboard controller (KBC) 30 queues, when receiving the power-on password mode command (password input command) from the CPU 21, the input of the password character string (steps S11–S13 in FIG. 8B).

When the password character string is input from the keyboard (BK) 51 and the [Enter] key is pressed after the characters are input, the keyboard controller (KBC) 30 verifies the input of the password, and compares to collate the input password with the registered password stored in the EEPROM 29 (steps S14–S15 in FIG. 8B).

In this case, two maintenance passwords and four user passwords can be registered at a maximum as power-on password to the EEPROM 29 to be accessed by the keyboard controller (KBC) 30 as shown in FIG. 6, and the registered passwords are to be compared with the input passwords.

The keyboard controller (KBC) 30 key-scans the keyboard (KB) 51 so as to input the password during active password checking, but the mouse 52 inhibits for communication. In this case, key-scan data are transmitted to the CPU 21.

Checking of the passwords of this case sequentially compares the input password with the first (#1) registered power-on password stored in the EEPROM 29.

When the passwords coincide in the checking of the passwords as described above, the access right to be described later is set, input coincident response (actually coincident "password location" as data in EEPROM 29 and "00h" as status) is returned. In the case of password noncoincidence, the input noncoincidence response (actually "FFh" as data and "01h" indicating no coincident password as status) is returned, and the password control command process is ended (steps S16, S17 in FIG. 8B).

The CPU 21 then continues, when receiving the input coincident response, the processing and normally stars the system (step S3 in FIG. 8A). The CPU 21 again, when receiving the input noncoincidence response, queues the password input (steps S3, S2, . . . in FIG. 8A).

The keyboard controller (KBC) 30 sequentially compares the passwords input in the checking of the passwords as described above with registered first (#1) power-on passwords stored in the EEPROM 29 (steps S21 S25 in FIG. 9), and sets the access right corresponding to the coincident password to the security register (SR) of the PCMCIA gate array 9PCMCIA-GA) 28 (steps S31–S33 in FIG. 9).

As shown in FIGS. 5 to 7, the power-on passwords can contain the access right in the power-on passwords. The access right specifies a range of user operation if the system is started with the password data.

In this specification, the access right is defined to include the supervisor privilege, the password updating right, the HDD access right, the FDD access right, the serial port access right, the printer port access right, the PCMCIA access right, and further defined to include maintenance privilege which is not unlocked to ordinary users.

The maintenance privilege ("1" is set to bit 7 (b7) of the security register (SR)) is given only to the passwords for the maintenance, and has all authorities including rewriting of the EEPROM 29, initializing of the EEPROM 29. This right is not unlocked to the ordinary users (only for maintenance). The power-on password having the privilege for the maintenance is limited to two. The setting is executed by a utility tool (T&D). If the passwords do not have the maintenance privilege (bit 7="0"), a write signal of the BIOS-ROM 25 is disabled as shown in FIG. 7.

The supervisor privilege ("1" is set to bit 6 (b6) of the security register (SR)) has all rights except rewriting of the BIOS-ROM 25 of flash memory (FLASH MEM) configuration, and can register, update, delete all the user passwords and the access right including the itself. The supervisor privilege is applied to the user password initially set by means of a utility tool. The supervisor privilege can be set to the second and following passwords. The passwords having the supervisor privilege can be registered, updated and deleted for all the user passwords. Further, setting of other passwords, and the access right can be executed.

The password updating right ("1" is set to bit 5 (b5) of the security register (SR)) is a right for updating the own power-on password, and cannot update other password. If this password updating right is not enabled, the own password cannot be updated in the case of setup or updating the power-on password.

The HDD access right, the FDD access right, the serial port access right, the printer port access right, and the PCMCIA access right are rights for enabling or disabling for accessing of the units, and arbitrary unit using can be set to all the user power-on passwords. The disabled unit cannot be accessed (in this case, it is excluded from the system configuration list).

The HDD access right of the device access rights is a right for enabling for use of the hard disk drive (HDD) 42. When the HDD access right is not enabled ("1" is not set to bit 4 (b4) of the security register (SR)), chip selects of the hard disk drive (HDD) 42 are all disabled.

The FDD access right is a right for enabling for use of the floppy disk drive 9FDD) 45. When the FDD access right is not enabled ("1" is not set to bit 3 (b3) of the security register (SR)), the motor-on signal of the floppy disk drive (FDD) 45 is disabled.

The serial port access right is a right for enabling for use of the serial port 41. When the serial port access right is not enabled ("1" is not set to bit 2 (b2) of the security register (SR)), transmission data SD and reception data RD of the SIO of the serial port 41 are disabled.

The printer port access right is a right for enabling for use of the printer port 43. When the printer port access right is not enabled ("1" is set to bit 1 (b1) of the security register (SR)), the chip sleet's of the control chip of the printer port 43 are disabled.

The PCMCIA access right is a right for enabling for use of the PCMCIA port 48. When the PCMCIA access right is not enabled ("1" is not set to bit 0 (b0) of the security register (SR)), the chip selects of the control chip of the PCMCIA port 48 are disabled.

The available right is always applied to any of the HDD access right and the FDD access right of the device access rights so as to avoid a defective state of starting no system due to no use of both the HDD and the FDD.

As described above, at the time of checking the power-on passwords, when the password coincident with the input password is registered into the EEPROM 29, a range of use operating is specified by the access right for the password. Accordingly, a plurality of passwords can be registered, and dedicated access rights can be set to the registered passwords. Therefore, the reliability of the security function can be improved.

In the embodiment described above, two passwords for maintenance persons and four passwords for users can be registered at a maximum as the power-on passwords. However, the present invention is not limited to the particular embodiment, but the arbitrary number of registered passwords can be set, and the access rights for the registered passwords can be set. The memory for storing the passwords is not limited to the EEPROM. For example, the passwords can be stored in other secondary power supported memory.

In the embodiments described above, the passwords are checked by the keyboard controller (KBC) 30. However, the present invention is not limited to the particular embodiment. The passwords can be checked by other sub CPU.

In the embodiment described above, the security register (SR) and the EEPROM access register are provided in the PCMCIA gate array (PCMCIA-GA) 28. However, this is executed due to circuit margin of the PCMCIA gate array (PCMCIA-GA) 28. For example, the status LCD control gate array (SLCDC-GA) 26 or other chip such as the sub CPU chip can be provided therefor.

Figure 10:
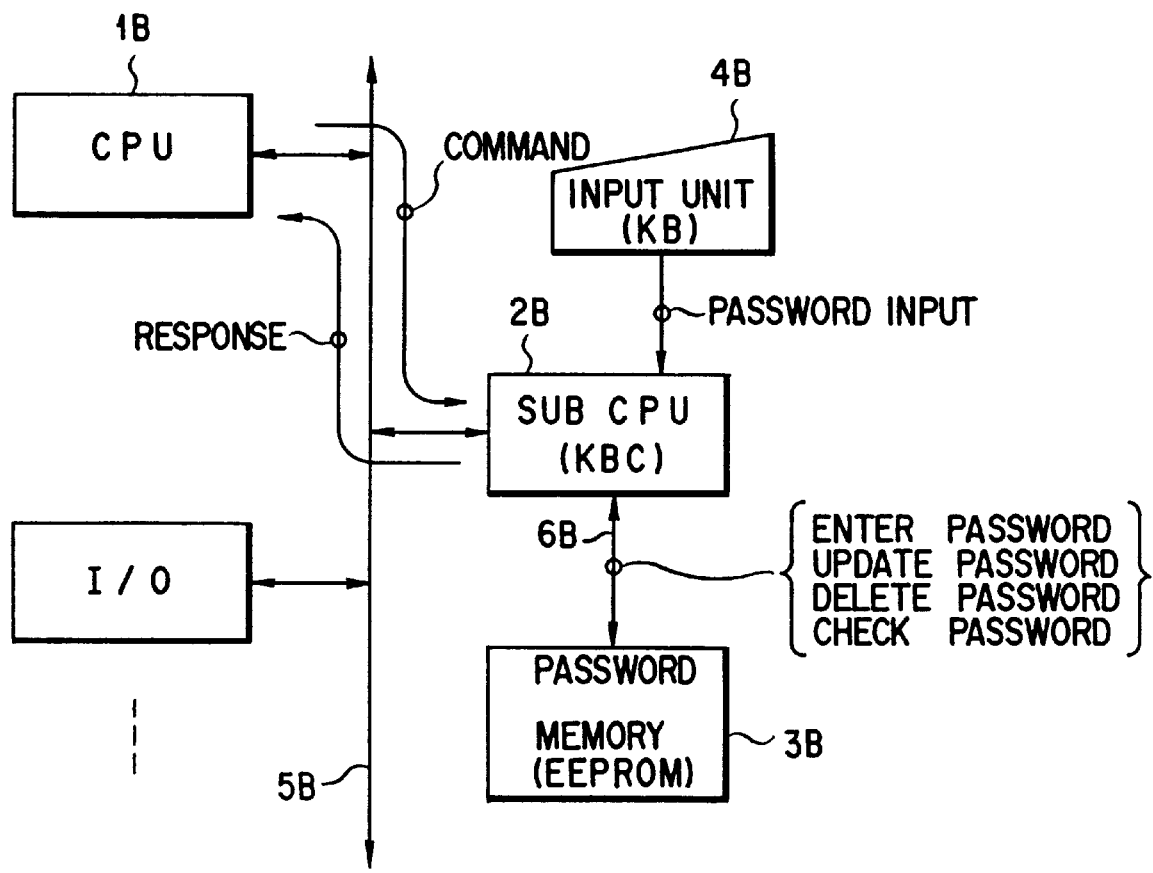
FIG. 10 is a block diagram showing a second essential construction of the portable computer shown in FIG. 2.

A second essential construction of the portable computer will be described below. FIG. 10 shows the second essential construction.

The second essential construction is characterized in that the portable computer has a security function in which registered passwords are hidden in the system (particularly, from a system bus).

As shown in FIG. 10, the portable computer includes a main CPU 1B for controlling the whole system, a sub CPU 2B connected to the main CPU 1B via a system bus 5B, a password memory, connected to the sub CPU 2B via a memory bus 6B having address and data lines, for storing a plurality of registered passwords, and an input section 4B for inputting a password. The main CPU 1B, sub CPU 2B, password memory 3B, input section 4B, system bus 5B, and memory bus 6B shown in FIG. 10 correspond to the main CPU 21, keyboard controller (KBC) 30, EEPROM 29, system bus 11, and memory bus 15.

In FIG. 2, the keyboard controller 30 incorporates a CPU, a ROM, a RAM, and an I/O port, and is connected to the EEPROM 29 via the memory bus 15. The EEPROM 29 stores a plurality of passwords under the control of the keyboard controller 30. The keyboard controller 30 has a password registering function for registering the password input from the keyboard (KB) 51 to the EEPROM 29 according to a password control command (password input command) from the CPU 21 as an internal control program processing function, and a password checking function for checking the validity of the input password by referring to the registered password stored in the EEPROM 29 according to the password control command (password check command) from the CPU 21. Further, the keyboard controller (KBC) 30 has communication control means for returning the result (coincidence/noncoincidence response) of checking the passwords to the main CPU 21.

In the construction described above, at the time of password registration, passwords input from the keyboard (KB) 51 are stored in the EEPROM 29 under the control of the keyboard controller (KBC) 30 according to the password control command (password input command) from the CPU 21. The passwords stored in the EEPROM 29 are managed by the keyboard controller (KBC) 30. At the time of power-on, the input password is collated to the passwords stored in the EEPROM 29 under the control of the keyboard controller (KBC) 30 according to the password control command (password check command) from the CPU 21, validity is judged, and its response (data indicating coincidence/noncoincidence and status) is returned to the CPU 21.

As described above, since the passwords are registered and checked only under the control of the keyboard controller (KBC) 2. Registering and checking of passwords are performed without any process of the CPU 21. Therefore, there is no fear of leaking the registered passwords stored in the EEPROM 29 on the system bus 11. Since the registered passwords can be concealed from the system bus 11, the reliability of the security function can be improved.

In the computer having a security function of checking an input password, the registered passwords are concealed from the system side to reliably prevent leakage of the passwords by a third parson to improve the security function. That is, the CPU 21 on the system bus (ISA-BUS) 11 does not check the passwords. The keyboard controller (KBC) 30 accesses the EEPROM 29 through the rear bus (keyboard interface bus (KBC-BUS) 13) to perform the password checking. Thus, the registered passwords cannot be known from the system bus (ISA-BUS) 11, thereby reliably preventing the leakage of the passwords.

Figures 11A, 11B:
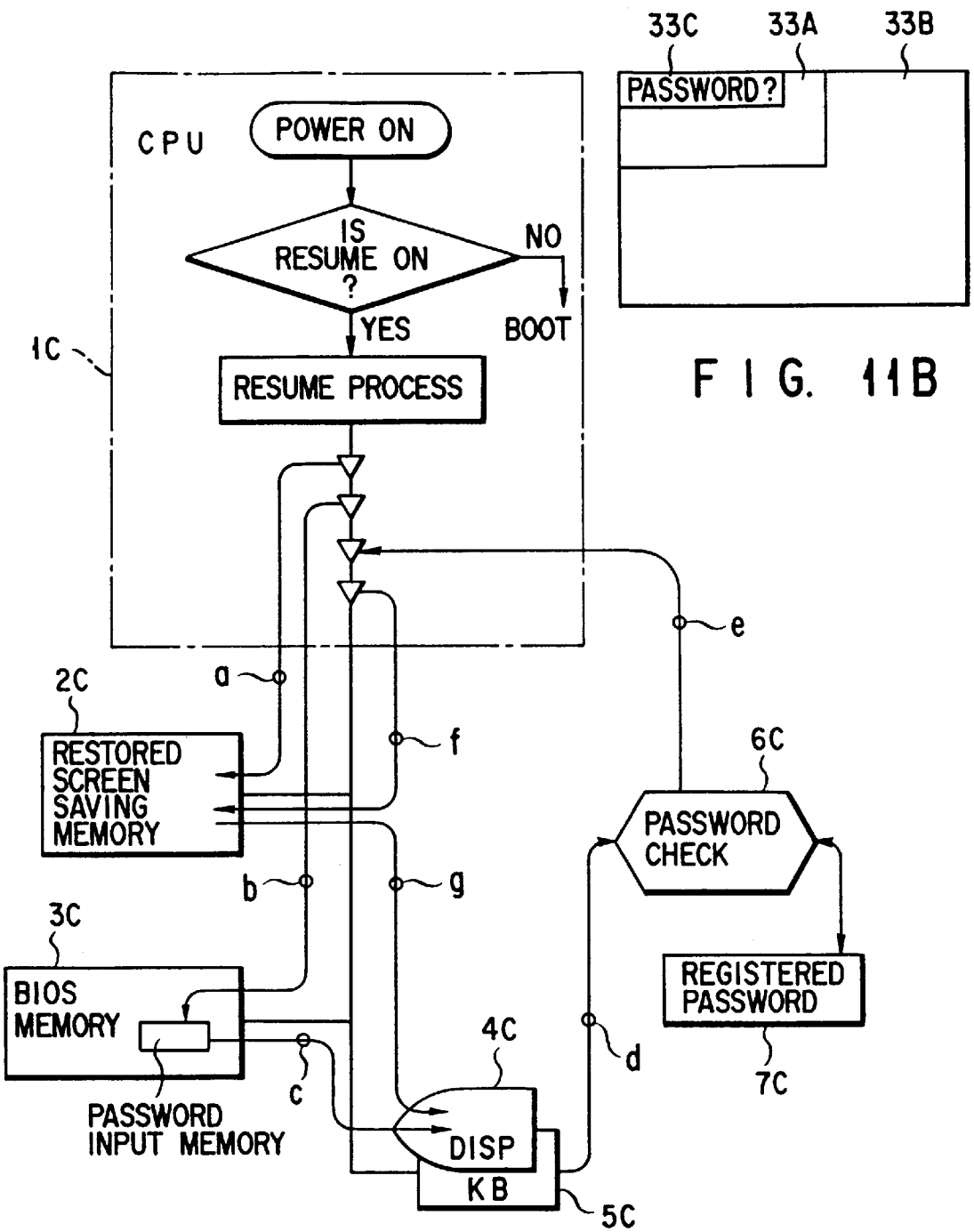
FIG. 11A is a block diagram showing a third essential construction of the portable computer shown in FIG. 2.
FIG. 11B is a memory map of a video memory shown in FIG. 2.

A third essential construction of the portable computer will be described below. FIG. 11A shows the second essential construction.

The third essential construction is characterized in that the portable computer resumes the display screen after an acceptable password is input.

As shown in FIG. 11A, the portable computer includes a main CPU 1C for controlling an overall system and having resuming process executing means, a saving memory 2C connected to the main CPU 1C via a system bus for temporarily saving display data on the display screen to be resumed, a BIOS memory 3C for storing display data of a password input window, a display unit 4C for selectively displaying the display data stored in the BIOS memory 3C and the saving memory 2C, a keyboard (KB) 5C for inputting a password, a nonvolatile memory 7C for storing a plurality of registered passwords, and a password checking section 6C for checking whether the password input from the keyboard 5C coincides with any one of the registered passwords stored in the non-volatile memory 7C and transmitting a response to the CPU 1C as a result of the checking.

The main CPU 1C, saving memory 2C, BIOS memory 3C, keyboard 5C, and nonvolatile memory 7C shown in FIG. 11A correspond to the main CPU 21, system memory 23, BIOS-ROM 25, keyboard 51, and EEPROM 29 shown in FIG. 2. The display unit 4C corresponds to the video memory (VRAM) 33, the LCD panel 49, and the like. The password checking section 6C corresponds to a microprogrammed processing means in the internal processor of the keyboard controller 30. The VGA controller 32 selectively sets one of a text display mode for displaying display data of a text form on the LCD panel 49 and a graphic display mode for displaying display data of a graphic form on the LCD panel 49. A mode register 32A stores mode flag data for selecting one of the text display mode and the graphic display mode. The video memory 33 has memory areas 33A and 33B as shown in FIG. 11B. the memory area 33A stores all the text-form display data in the text display mode and part of the graphic-form display data in the graphic display mode. The memory area 33B stores the remainder of the graphic-form display data in the graphic display mode. The BIOS-ROM 25 has text-form display data representing a password input requesting message as a password input window. At the time of inputting a password, the message display data is stored in the memory area 33A in place of display data restored in the resume process.

The operation of the above construction will be described.

The CPU 1C restores the display screen at the time of suspending in the case of resuming upon turning of a system power source ON and temporarily saving the restored screen in the saving memory 2C. Then, the CPU 1C reads the password input window previously stored in the BIOS memory 3C instead of the restored screen, and causes the password input window to be displayed on the display unit (DISP) 4C. When a password is input on the password input window, it is checked whether the input password coincides with any one of the registered passwords stored in the nonvolatile memory 7C by the password checking unit 6C. (A this time, the input password is not displayed. Thus, there is no fear of reading the password by a third person.) The password checking unit 6C returns a response to the CPU 21 as a result of the password checking.

The CPU 1C reads the display data stored in the saving memory 2C when it is detected from the response that the input password is acceptable, and cause it to be displayed on the display unit 4 instead of the password input window.

As described above, the display screen is resumed after the input password is accepted. Thus, leakage of information in the resume mode by a third person can be prevented.

Regarding the third essential construction, the operation of the portable computer will be described in detail.

In the resuming process after the system power is switched on, the CPU 21 restores the display screen at the time of suspending, and temporarily saves the resumed screen (display data) in a predetermined area of the system memory 23. Further, the CPU 21 issues a power-on password mode command (password input command) to the keyboard controller (KBC) 30. Then, the CPU 21 reads the message display data stored in the BIOS-ROM 25, sends it to the VGA controller 32 to display the password input window on the LCD panel 40. When a password is input on the password input window, the keyboard controller (KBC) 30 checks whether the input password coincides with any one of the registered passwords stored in the EEPROM 29. More specifically, the keyboard controller (KBC) 30 starts checking of the passwords upon receiving of the key code upon operation of the [Enter] key after the password character string is received from the keyboard (KB) 51. After the password checking, the keyboard controller (KBC) 30 transmits a response (data/status) to the CPU 21. When the coincidence is detected in the password checking, data representing the coincident password location and status "00h" representing a normal end are transmitted to the CPU 21 through the communication register of the status LCD control gate array (SLCDC GA) 26. In response to this response, the CPU 21 reads, the resumed screen temporarily saved in the system memory 23, and restores it in the video memory 33 through the VGA controller 32, so as to display the resumed screen on the LCD panel 49 instead of the password input window.

As described above, when the power source is switched on in the resume mode, the password checking is performed on the input password. The resumed screen is not displayed before the input password is detected to be acceptable in the password check. Thus, an unauthorized user cannot obtain the information concerning an interrupted data processing, without inputting a correct password.

In the embodiment, all display data of the resumed screen are temporarily moved from the video memory 33 to the system memory 23. However, it is not necessary to save the display data to the system memory 23 if the main CPU 21 is arranged as follows:

In this case, the main CPU 21 performs a control process of controlling the VGA controller 32 to set the LCD panel 49 to a blank display state or a nonoperable state.

When display data stored in the video memory 33 are of the graphic form, the main CPU 21 performs another control process of controlling the VGA controller 32 to temporarily switching the LCD panel 49 to the text display mode to inhibit the graphic-form display data from being displayed. Further, the another process may include a process of saving the graphic-form display data stored in a portion 33C of the first memory area 33A after the LCD panel 49 is switched to the text display mode, and set display data of a password input requesting message in the portion 33C of the first memory area 33A.

A fourth essential construction of the portable computer will be described below. FIG. 12 shows the fourth essential construction.

The fourth essential construction is characterized in that the portable computer sets an operation password for unlocking an operation lock independently of the power-on password for starting a data processing immediately after the power source is switched on.

As shown in FIG. 12, the portable computer includes a CPU 1D, a password memory 2D, an input section (KB) 3D, and a password checking section 4D. The portable computer has a password checking function at the time of power-on and an operation locking and its unlocking function for temporarily disabling the system. The CPU 1D issues a power-on password check command (power-on password mode command) for a power-on password checking process, and an operation lock unlocking command (operation lock password mode command) for a operation lock unlocking process. The password memory 2D stores a plurality of power-on passwords and a plurality of operation passwords to be used to unlock the operation lock. The input section (KB) 3D is used for inputting a password (a string of password characters). At the time of power-on, a power-on password is input. At the time of unlocking the operation lock, an operation password is input. The password checking section 4D performs a password checking on the password input by the input section 3D under the control of the CPU 1D. When the power-on password check command (power-on password mode command) is supplied to the password checking section 4D, it is checked whether the input password coincides with any of the power-on passwords stored in the password memory 2D. When the operation lock unlocking command (operation lock password mode command) is supplied to the password checking section 4D, it is checked whether the input password coincides with any of the operation passwords stored in said password memory 2D. Each of the operation passwords is assigned to a corresponding one of the power-on passwords. In an initial state, there is no operation password assigned to the power-on passwords. Therefore, the power-on passwords serve as default operation passwords, and are compared with the input password input by the input section 3D.

In this essential construction, the CPU 1D issues the power-on password check command (power-on password mode command) in an initialization (or resuming process) performed immediately after the system power source is switched on.

At this time, a password input window is displayed on a display unit under the control of BIOS according to the password check command. Even if a string of password characters is input, the input characters (content of the password) are not displayed on the password input window. Thus, a leakage of the password to a third person is prevented.

When the CPU 1D issues the power-on password check command, the password checking section 4D compares the input password input by the input section 3 with the power-on passwords stored in the password memory 2D, and returns a response to the CPU 1D after the password checking. When it is detected from the response that the input password has been accepted, the CPU 1D continues the following process and then starts the system control for performing a data processing according to an application program.

In an operation lock state, only the password is allowed to be key-input. A string of password characters immediately before [Enter] key is pressed is stored in an input buffer, and the other key-input is ignored. Simultaneously, the display screen is cleared.

When a password is input in an operation lock state, this input state is noticed to the CPU 1D, and the CPU 1D issues an operation lock unlocking command (operation lock password mode command).

When the CPU 1D issues the command, the password checking section 4D compares the password input by the input section 3D with the operation passwords stored in the password memory 2D, and returns a response to the CPU 1D after the password checking. When it is detected from the response that the input password has been accepted, the CPU 1D unlocks the operation lock, thereby permitting the computer system to be used.

As described above, since the power-on passwords for use in the power-on password check and the operation passwords for use in the operation lock unlocking password check can be independently set in the password memory 2D, an operability (high availability) is improved, and the reliability of the security function is also improved.

Regarding the fourth essential construction, the operation of the portable computer will be described in detail.

In the case of the operation lock, an instant security (an operation lock in this case) prompt is noticed from the keyboard controller (KBC) 30 to the CPU 21 by the above-described SMI process by operating hot keys (Fn+F1) for an instant security during active application, and the lock is executed under the control of the CPU 21 according to the notice.

The keyboard (KB) 51 and key-input of an external keyboard are ignored in the operation lock state, and a PS/2 mouse 52 is disabled. In this case, the keyboard controller (KBC) 30 accepts the key-input, so as to enable for inputting the password, but inhibits to out-put to the system bus (ISC-BUS) 11. Simultaneously, display data on the LCD panel 49 and an external CRT are cleared. In this case, the VGA controller 32 and the video memory (VRAM) 33 can be accessed.

Figure 13:
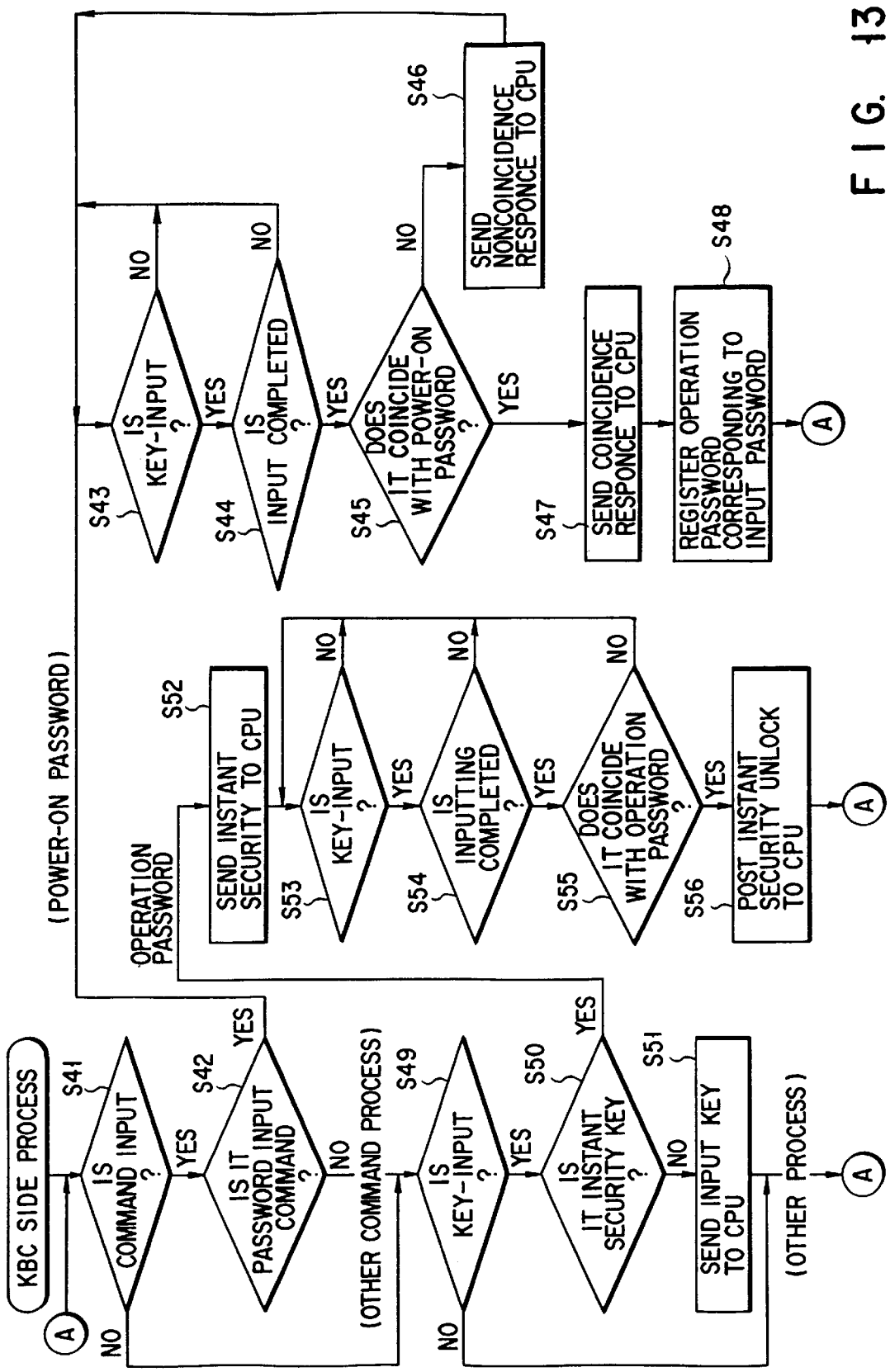
FIG. 13 is a flowchart for explaining an operation unlocking process performed by the keyboard controller.

When the hot keys (Fn+F1) are operated for an instant security in the operation lock state, the instant security (unlocking the operation lock in this case) prompt is noticed from the keyboard controller (KBC) 30 to the CPU 21, and the CPU 21 issues an operation lock password mode command according to the notice (steps S50 to S52 in FIG. 13).

The keyboard controller (KBC) 30 queues, when receiving the operation lock password mode command, the password inputting.

When a password character string is input from the keyboard (KB) 51 and the [Enter] key is pressed after the characters are input, the keyboard controller (KBC) 30 recognizes the input of the passwords, and compares to collate the input passwords to entered passwords stored in the EEPROM 29, i.e., the operation passwords in this case (steps S53 to S56 in FIG. 13).

In this case, as shown in FIG. 6, four cases at the maximum can be set and entered as user' operation passwords to the EEPROM 29 accessed by the keyboard controller (KBC) 30, and the registered password is compared with the input password. If the operation passwords are not registered, the power-on passwords are to be compared with the input password.

In the case of checking the passwords in this instance, the input password is sequentially compared from the first (#1) entered operation passwords stored in the EEPROM 29.

When the passwords are coincident in the above case of checking the passwords, a response of unlocking the operation lock (a coincident password location in the EEPROM 29 as data and "00h" as status in the actual case) is returned, and the password control command process is finished (in step S56 in FIG. 13).

If the noncoincidence is detected, inputting of the password is requested again.

As described above, the power-on passwords for use in the power-on password check and the operation passwords for use in the operation lock unlocking password check can be independently set in the EEPROM 29, an operability (availability) can be thereby improved, and the reliability of the security function is also improved.

Figure 14:
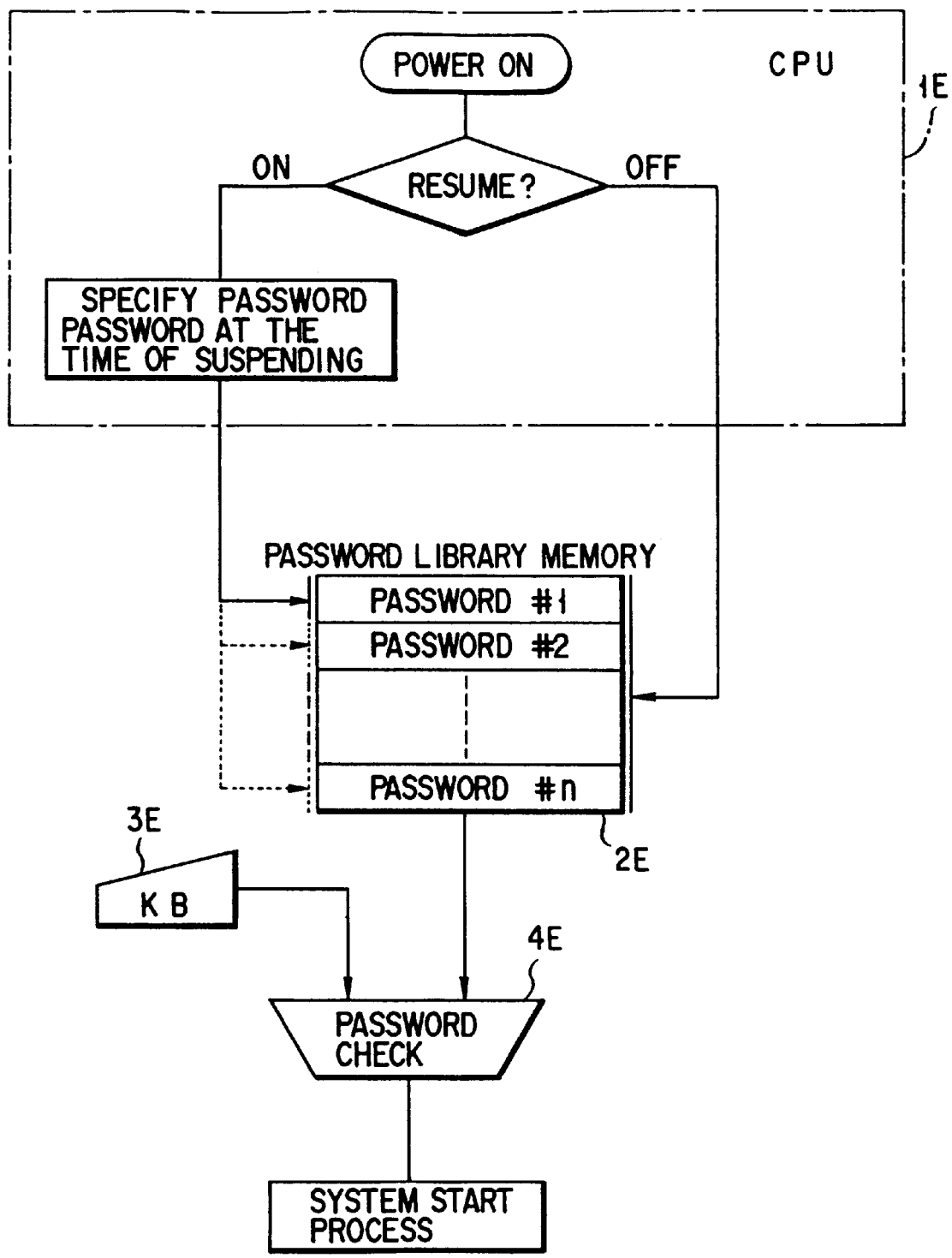
FIG. 14 is a block diagram showing a fifth essential construction of the portable computer shown in FIG. 2.

A fifth essential construction of the portable computer will be described below. FIG. 14 shows the fifth essential construction.

The fifth essential construction is characterized in that the portable computer restarts an interrupted data processing the display screen after the input password is accepted by comparing it with the password saved at the time of power-off.

As shown in FIG. 14, the portable computer includes a CPU 1E, a password memory 2E, an input section (KB) 3E, and a password checking section 4E.

In FIG. 14, the CPU 1E controls overall system and has a function of performing a suspension process and a resume process. The password memory 2E stores a plurality of registered passwords. The input section (KB) is used for inputting a password (a string of password characters). The password checking section 4E performs a password checking on the password input by the input section 3E, under the control of the CPU 1E. In a combination of a resume mode and a password check mode, the CPU 1E specifies that one of the registered passwords stored in the password memory 2E, and the password checking section 4E checks whether the input password coincides with the specified one of the registered passwords. On the other hand, in a ordinary password check mode excluding the resume mode, the password checking section 4E checks whether the input password coincides with any one of the registered passwords stored in the password memory 2E.

In the construction described above, the CPU 1E performs the suspension process at the time of power-off in the combination of the resume mode and the password check mode and the resume process at the time of power-on in the combination of the resume mode and the password check mode. A password checking is performed in the resume process. In the suspension process, the CPU 1E interrupt a data processing according to an application program, obtains from the password checking section 4E the number data (password #) designating that one of the registered passwords stored in the password memory 2E which coincides with the password input during the previous password checking performed for starting the data processing, and saves the number data along with state data of the interrupted data processing in a nonvolatile saving memory (e.g., system memory 23 in FIG. 2). In the resume process, the CPU 1E reads the number data stored in the saving memory and supplies it in the form of a command parameter to the password checking section 4E. The password checking section 4E checks whether an password input be the input section 3E coincides with one of the registered passwords specified by the number data, and returns a response to the CPU 1E after the password checking. When it is detected from the response that the input password coincides with the specified password. The CPU 1E restores the saved state data to restart the data processing from the point As described above, when the system power source is switched on in a resume mode, the password checking section 4E checks whether the input password coincides with the registered password specified by the data saved at the time of the suspension process. The CPU 1E restarts the data processing from the interrupted point after the input password has been accepted. Therefore, it is possible to prevent a leakage of information and inconvenience of losing the state of the interrupted data processing by a third person.

Regarding the fifth essential construction, the operation of the portable computer will be described in detail. The CPU 1E, password memory 2E, input section 3E, and password checking section 4E shown in FIG. 14 correspond to the CPU 21, EEPROM 29, keyboard 51, and keyboard controller 30 shown in FIG. 2.

In the suspension process performed to interrupt a data processing, the CPU 21 saves the password # obtained as a command parameter from the keyboard controller 30 in a saving area of the battery-backup system memory 23.

When the system power source is switched on in the resume mode, the CPU 21 resumes the display screen in the resume process performed to restart the interrupted data processing, and temporarily saves the resumed screen in a predetermined area of the system memory 23. Further, the CPU 21 issues a power-on password mode command (password input command) with the password # as parameter at the time of suspending to the keyboard controller (KBC) 30 (steps S61, S63 in FIG. 15).

Then, the CPU 21 reads the password input requesting message previously stored in the BIOS-ROM 25 instead of the resumed screen, sends it to the VGA controller 32, and displays the password input window according to the password input requesting message on the LCD panel 49.

Figure 16:
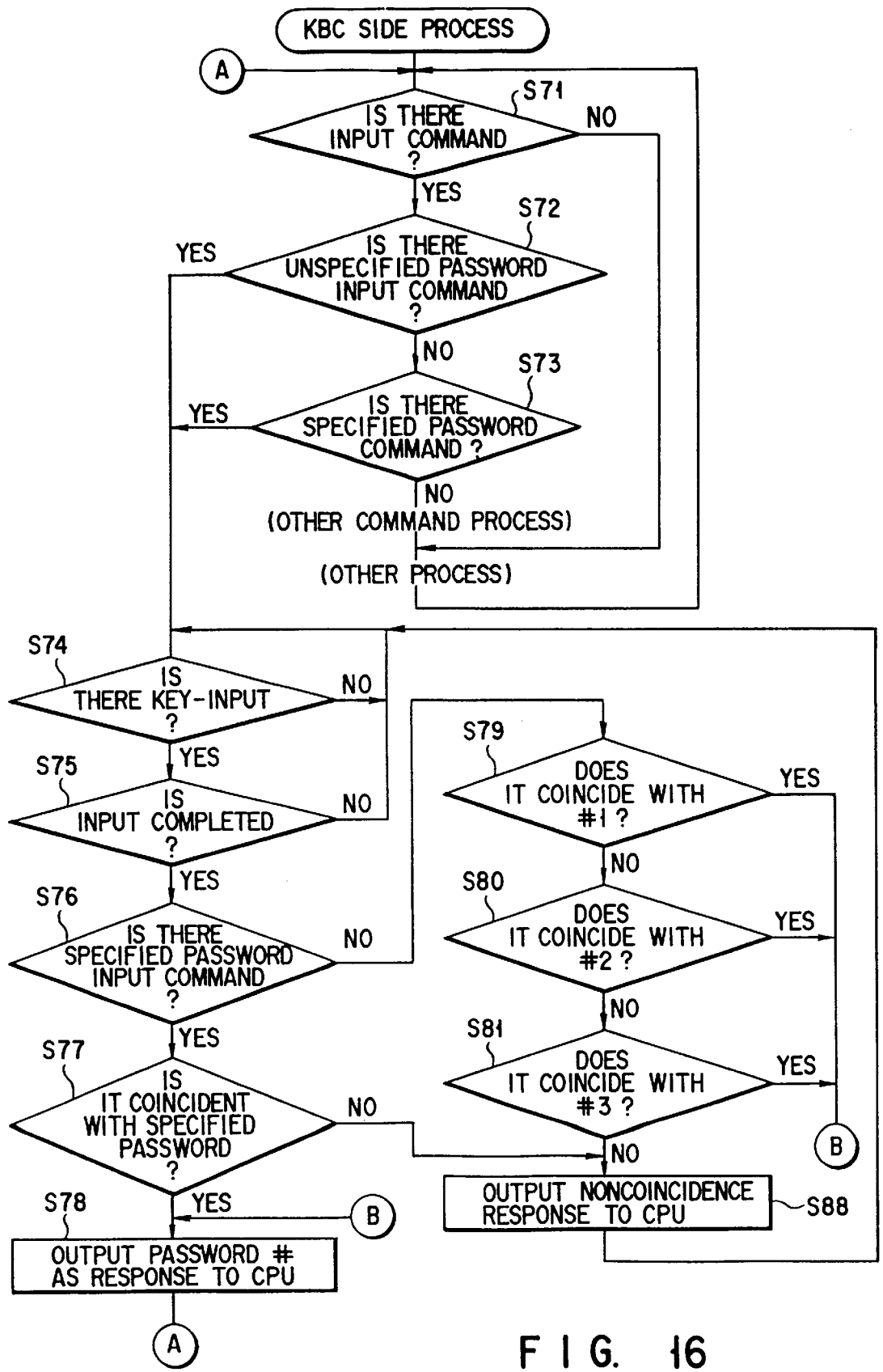

The keyboard controller (KBC) 30 requests, when receiving the power-on password mode command (password input command) issued from the CPU 21, the password input from the keyboard (KBC) 51 (steps S71 to S74 in FIG. 16).

When the passwords are key-input on the password input window, the keyboard controller (KBC) 30 accesses the EEPROM 29, checks whether the input password coincides with the registered password specified by the parameter (passwords #) of the command (steps S75 to S77 in FIG. 16).

When the coincidence is detected in the password checking, a response of the password coincidence (data/status) is returned to the CPU 21. More specifically, "coincident password location" as data and "00h (normal end)" as status are transmitted to the CPU 21 through the communication register of the status LCD control gate array (SLDCCNGA) 26 (step S78 in FIG. 16).

Figure 15:
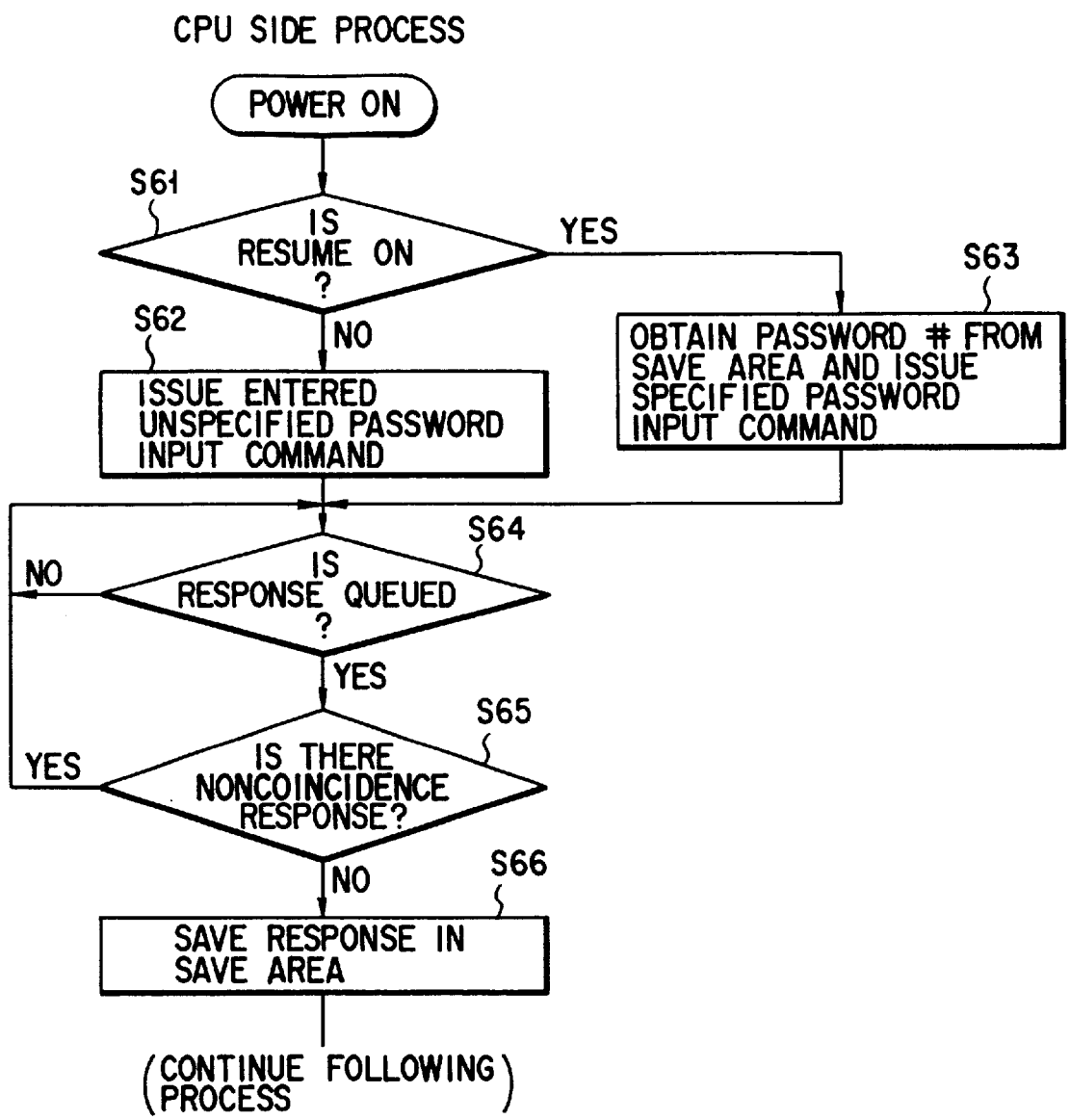
FIGS. 15 and 16 are flowcharts for explaining processes which the CPU and keyboard controller perform in a combination of the resume mode and the power-on password check mode, respectively.

The CPU 21 saves, when receiving the response of the password coincidence, the response in the saving area of the system memory 23 (step S66 in FIG. 15). Thereafter, the CPU 21 continues the normal resume process, displays the resumed screen instead of the password input window, enables for key-inputting of the keyboard (KB) 51 in the restarted data processing.

When the resume mode is not set (resume is off), the CPU 21 issues a power-on password mode command for not specifying the passwords (i.e., having no parameter) (password input command) to the keyboard controller (KBC) 30 (step S62 in FIG. 15).

In this case, the password input during the password checking performed by the keyboard controller (KBC) 30 is sequentially compared with all the registered passwords stored in the EEPROM 29 (S79 to S81 in FIG. 16). In the case of password coincidence, a response of the coincidence passwords (data/status) is returned to the CPU 21 (step S78 in FIG. 16). Thereafter, the similar process is executed.

As described above, when the system power source is switched on in a resume mode, the keyboard controller 30 checks whether the input password coincides with the registered password specified by the data saved at the time of the suspension process. The CPU 21 restarts the data processing from the interrupted point after the input password has been accepted. Therefore, it is possible to prevent a leakage of information and inconvenience of losing the state of the interrupted data processing by a third person.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A personal computer comprising:

a memory for storing at least one user password and at least one manager password;

input means for inputting a password from an operator;

determining means for determining whether the input password coincides with either one of the at least one user password stored in said memory or one of the at least one manager password stored in said memory;

first assigning means for assigning a first enable operation range corresponding to a functional mode in a case where the determining means determines that the input password coincides with one of the at least one manager password; and second assigning means for assigning a second enable operation range within the functional mode having the first enable operation range in a case where the determining means determines that the input password coincides with one of the at least one user password.

2. A personal computer according to claim 1, wherein said second assigning means assigns the second enable operation range in order to give a setting right of the at least one user password and of the input password to the operator who input one of the manager password, and in order to give the setting right of the input password except for the setting right of the at least one manager password to the operator who input one of the user passwords.

3. A personal computer according to claim 2, wherein the setting right indicates an authorization for password storing into said memory, for password deleting, and for password updating.

4. A personal computer according to claim 2, wherein said second assigning means allows the operator who input one of the at least one manager passwords to change the first enable operation range of the at least one user password, and disables the operator who input one of the at least one user password to change the second enable operation range of the at least one user password.

5. A personal computer according to claim 1, wherein the functional modes includes at least one of a power save mode, a resume/boot mode, and LCD (Liquid Crystal Display)/CRT (Cathode Ray Tube display mode and an LCD panel black/white inversion display mode.

* * * * *